United States Patent
Ryu et al.

(10) Patent No.: US 12,408,185 B2
(45) Date of Patent: Sep. 2, 2025

(54) METHOD AND APPARATUS FOR CONTROLLING UE TRANSMISSION POWER IN WIRELESS COMMUNICATION SYSTEM

(71) Applicant: Samsung Electronics Co., Ltd., Suwon-si (KR)

(72) Inventors: Hyunseok Ryu, Suwon-si (KR); Jonghyun Bang, Suwon-si (KR); Cheolkyu Shin, Suwon-si (KR); Jeongho Yeo, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/950,273

(22) Filed: Nov. 17, 2020

(65) Prior Publication Data

US 2021/0185685 A1 Jun. 17, 2021

(30) Foreign Application Priority Data

Dec. 12, 2019 (KR) .......................... 10-2019-0166001

(51) Int. Cl.
*H04W 72/04* (2023.01)
*H04L 5/00* (2006.01)
(Continued)

(52) U.S. Cl.
CPC ........... *H04W 72/53* (2023.01); *H04L 5/0094* (2013.01); *H04W 8/24* (2013.01); *H04W 52/242* (2013.01);
(Continued)

(58) Field of Classification Search
None
See application file for complete search history.

(56) References Cited

U.S. PATENT DOCUMENTS 11,101,902 B2 8/2021 Lee et al.
2021/0037534 A1 2/2021 Ji
(Continued)

FOREIGN PATENT DOCUMENTS

CN 109769377 A 5/2019
CN 1103883721 A 10/2019
(Continued)

OTHER PUBLICATIONS

Ericsson, on simultaneous transmission of PSFCH, 3GPP TSG-RAN4 Meeting #92bis, R4-1912301, Oct. 4, 2019, Chongqing, China.
(Continued)

*Primary Examiner* — Noel R Beharry
*Assistant Examiner* — Pamit Kaur
(74) *Attorney, Agent, or Firm* — Jefferson IP Law, LLP

(57) ABSTRACT

A method performed by a terminal in a wireless communication system is provided. The method includes receiving, from at least one other terminal, at least one physical sidelink shared channel (PSSCH), in response to the receiving of the at least one PSSCH, determining the number of at least one physical sidelink feedback channel (PSFCH) based on the maximum number of the at least one PSFCH for simultaneous transmission, and transmitting, to the at least one other terminal, one or more PSFCHs, based on the number of the at least one PSFCH.

10 Claims, 16 Drawing Sheets

(51) Int. Cl.
  *H04W 8/24* (2009.01)
  *H04W 52/24* (2009.01)
  *H04W 52/36* (2009.01)
  *H04W 56/00* (2009.01)
  *H04W 72/044* (2023.01)
  *H04W 72/20* (2023.01)
  *H04W 72/53* (2023.01)
  *H04W 92/18* (2009.01)

(52) U.S. Cl.
  CPC ....... *H04W 52/367* (2013.01); *H04W 56/001* (2013.01); *H04W 72/0473* (2013.01); *H04W 72/20* (2023.01); *H04W 92/18* (2013.01)

(56) References Cited

U.S. PATENT DOCUMENTS

| | | | | |
|---|---|---|---|---|
| 2021/0105768 A1* | 4/2021 | Nguyen | ................ | H04L 1/1685 |
| 2021/0219320 A1* | 7/2021 | Belleschi | ............... | H04W 72/20 |
| 2022/0232520 A1* | 7/2022 | Yoshioka | .............. | H04L 1/1854 |
| 2022/0287044 A1* | 9/2022 | Yoshioka | ............ | H04W 72/085 |
| 2022/0345249 A1* | 10/2022 | Yoshioka | .............. | H04L 1/1861 |

FOREIGN PATENT DOCUMENTS

| | | | | | |
|---|---|---|---|---|---|
| CN | | 112653541 A * | 4/2021 | ............ | H04W 52/32 |
| WO | WO-2018064009 A1 * | | 4/2018 | ............ | H04B 7/0404 |
| WO | | 2019/196829 A1 | 10/2019 | | |
| WO | WO-2020143756 A1 * | | 7/2020 | ............ | H04W 56/00 |

OTHER PUBLICATIONS

Intel Corporation, Design of physical layer procedures for NR V2X sidelink, 3GPP TSG RAN WG1 RAN1#96bis, R1-1904299, Apr. 3, 2019, Xi'an, China.

Vivo, Sidelink synchronization mechanism, 3GPP TSG RAN WG1 Meeting #98bis, R1-1911421, Oct. 22, 2019, Chongqing, China.

Huawei et al., Sidelink physical layer procedures for NR V2X, 3GPP TSG RAN WG1 Meeting #99, R1-1911887, Nov. 9, 2019, Reno, USA.

International Search Report dated Feb. 23, 2021, issued in International Application No. PCT/KR2020/016235.

InterDigital, Inc., "Physical Layer Procedures for NR V2X Sidelink," 3GPP TSG RAN WG1 #99, R1-1912742, Reno, USA, Nov. 18-22, 2019.

Samsung, "On Physical Layer Procedures for NR V2X," 3GPP TSG RAN WG1 #98b1s, R1-1910475, Chongqing, China, Oct. 14-20, 2019.

European Search Report dated May 17, 2023, issued in European Application No. 20898740.4.

Chinese Office Action Jan. 9, 2024, issued in Chinese Application No. 202080085966.3.

Chinese Office Action with English translation dated Jul. 30, 2024; Chinese Appln. No. 202080085966.3.

* cited by examiner

IN-COVERAGE SCENARIO

PARTIAL COVERAGE SCENARIO

OUT-OF-COVERAGE SCENARIO

INTER-CELL V2X COMMUNICATION SCENARIO

UNICAST V2X COMMUNICATION

GROUPCAST V2X COMMUNICATION

METHOD AND APPARATUS FOR CONTROLLING UE TRANSMISSION POWER IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0166001, filed on Dec. 12, 2019, in the Korean Intellectual Property Office, the disclosure of which is incorporated by reference herein in its entirety.

BACKGROUND

1. Field

The disclosure relates to a method and apparatus for controlling a transmission power of a terminal in a wireless communication system. More particularly, the disclosure relates to a method and apparatus for configuring, by a terminal, a transmission power of a sidelink synchronization channel and a sidelink feedback channel.

2. Description of Related Art

To satisfy soaring demand with respect to wireless data traffic after the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as beyond-4G-network communication systems or post-long term evolution (LTE) systems. The 5G communication system prescribed in the $3^{rd}$ Generation Partnership Project (3GPP) is called a new radio (NR) system. To achieve higher data transmission rates, implementation of developing communication systems in ultra-high frequency bands millimeter wave (mmWave), such as, e.g., 60 gigahertz (GHz), is being considered. In 5G communication systems, beamforming, massive multi-input multi-output (MIMO), full dimensional MIMO (FD-MIMO), an array antenna, analog beamforming, and large-scale antenna technologies have been discussed as ways of alleviating pathloss of radio waves and increasing transmission distances of radio waves in ultra-high frequency bands, and have also been applied to NR systems. For system network improvement, in 5G communication systems, technologies, such as evolved small cell, advanced small cell, cloud radio access network (RAN), ultra-dense network, device-to-device (D2D) communication, wireless backhaul, moving network, cooperative communication, coordinated multi-points (CoMPs), and interference cancellation have been developed. In a 5G system, Advanced Coding Modulation (ACM) schemes including hybrid Frequency-Shift Keying (FSK) and Quadrature Amplitude Modulation (QAM) Modulation (FQAM) and Sliding Window Superposition Coding (SWSC), and advanced access schemes including Filter Bank Multi Carrier (FBMC), Non-Orthogonal Multiple Access (NOMA), and Sparse Code Multiple Access (SCMA) have been developed.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, and the like. To implement the IoT, various technological elements, such as a detection technology, wired/wireless communication and network infrastructure, service interface technology, and security technology, are required, and recently technologies related to sensor networks for connecting objects, machine to machine (M2M), machine type communication (MTC), and so forth have been researched. Such an IoT environment may provide intelligent Internet technology (IT) services that create new value in human life by collecting and analyzing data generated among connected objects. IoT may be applied to a variety of fields including smart homes, smart buildings, smart cities, smart cars or connected cars, smart grids, health care, smart appliances, advanced medical services, and so forth through convergence and combination between existing information technology (IT) and various industries.

Thus, various attempts have been made to apply 5G communication systems to IoT networks. For example, 5G communication, such as sensor networks, M2M, MTC, and the like, has been implemented by a scheme, such as beamforming, MIMO, an array antenna, and so forth. The application of a cloud RAN as a Big Data processing technology may also be an example of the convergence of 5G technology and IoT technology.

As described above, various services may be provided as mobile communication systems develop, and accordingly, methods for effectively providing such services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for effectively controlling a transmission power of a terminal in a wireless communication system.

Additional aspects will be set forth in part in the description which follows and, in part, will be apparent from the description, or may be learned by practice of the presented embodiments of the disclosure.

In accordance with an aspect of the disclosure, a method performed by a terminal in a wireless communication system is provided. The method includes receiving, from at least one other terminal, at least one physical sidelink shared channel (PSSCH), in response to the receiving of the at least one PSSCH, determining the number of at least one physical sidelink feedback channel (PSFCH) based on the maximum number of the at least one PSFCH for simultaneous transmission, and transmitting, to the at least one other terminal, one or more PSFCHs, based on the number of the at least one PSFCH.

In accordance with another aspect of the disclosure, a terminal in a wireless communication system is provided. The terminal includes a transceiver and at least one processor configured to receive, via the transceiver, at least one physical sidelink shared channel (PSSCH) from at least one other terminal, in response to the reception of the at least one PSSCH, determine the number of at least one physical sidelink feedback channel (PSFCH), based on the maximum number of the at least one PSFCH for simultaneous transmission, and transmit, via the transceiver, one or more PSFCHs to the at least one other terminal, based on the number of the at least one PSFCH.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
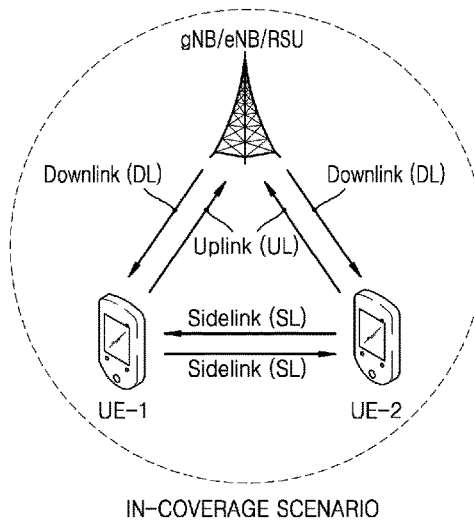
FIG. 1A illustrates an operation where all sidelink terminals are located under coverage of a base station according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When embodiments of the disclosure are described, technical matters that are well known in a technical field of the disclosure and are not directly related to the disclosure will not be described. By omitting any unnecessary description, the subject matter of the disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Advantages and features of the disclosure and a method for achieving them will be apparent with reference to embodiments of the disclosure described below together with the attached drawings. However, the disclosure is not limited to the disclosed embodiments of the disclosure, but may be implemented in various manners, and the embodiments of the disclosure are provided to complete the disclosure of the disclosure and to allow those of ordinary skill in the art to understand the scope of the disclosure. The disclosure is defined by the category of the claims. Throughout the specification, an identical reference numeral will indicate an identical element.

Meanwhile, it is known to those of ordinary skill in the art that blocks of a flowchart and a combination of flowcharts may be represented and performed by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operations to be performed on the computer or other programmable apparatus to produce a computer implemented process, such that the instructions that perform the computer or other programmable apparatus may provide operations for implementing the functions specified in the flowchart and/or block diagram block or blocks.

In addition, each block represents a module, segment, or portion of code, which includes one or more executable instructions for implementing the specified logical function (s). It should also be noted that in other implementations, the function(s) noted in the blocks may occur out of the order indicated. For example, two blocks shown in succession may, in fact, be performed substantially concurrently or the blocks may sometimes be performed in the reverse order, depending on the functionality involved.

In the current embodiment of the disclosure, the term 'unit', as used herein, denotes a software or hardware component, such as a field programmable gate array (FPGA) or application specific integrated circuit (ASIC), which performs certain tasks. However, the meaning of 'unit' is not limited to software or hardware. 'unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to perform one or more computer processing units (CPUs) in a device or a secure multimedia card. In the embodiments of the disclosure, '~unit' may include one or more processors.

While a detailed description will be made of embodiments of the disclosure, focusing on a radio access network, a new radio access network (NR), a core network, and a packet core (a $5^{th}$ generation (5G) system, a 5G core network, or a next generation (NG) core) in 5G mobile communication standards specified by the 3rd generation partnership project (3GPP) that is a mobile communication standardization organization, the subject matter of the disclosure may also be applied with slight modifications to other communication systems having similar technical backgrounds without greatly departing from the scope of the disclosure, as will be determined by those of ordinary art in the art.

In the disclosure, a sidelink terminal may indicate an NR vehicle-to-everything (V2X) terminal or a long term evolution (LTE) V2X terminal. In the disclosure, a sidelink terminal may indicate a terminal supporting device-to-device (D2D) communication. In the disclosure, a V2X terminal may mean a vehicle supporting vehicular-to-vehicular (V2V) communication, a vehicle or a pedestrian's headset (i.e., smartphone) supporting vehicular-to-pedestrian (V2P) communication, or a vehicle supporting vehicular-to-network (V2N) communication, or a vehicle supporting vehicular-to-infrastructure (V2I) communication. In the disclosure, the UE may also refer to a road side unit (RSU) having a UE function, an RSU having a base station function, an RSU having a part of the UE function and a part of the base station function.

In the disclosure, a sidelink transmission terminal may mean a terminal transmitting sidelink data and control information or a terminal receiving sidelink feedback information. The sidelink reception terminal may mean a terminal receiving sidelink data and control information or a terminal transmitting sidelink feedback information.

An embodiment of the disclosure may provide a method and apparatus for controlling a transmission power of a sidelink synchronization channel to improve coverage of a sidelink system and to minimize interference caused by the sidelink system to a cellular system.

In addition, an embodiment of the disclosure may provide a method and apparatus for controlling a transmission power of a sidelink feedback channel to improve reliability of a sidelink system and to support a high transmission rate.

Moreover, an embodiment of the disclosure may provide an apparatus and method of effectively providing a service in a mobile communication system.

According to an embodiment of the disclosure, based on a quality of a channel between a base station and a sidelink terminal, transmission power parameters of a sidelink synchronization channel and a sidelink feedback channel may be adjusted. In this way, in a sidelink system using vehicular communication or D2D communication, coverage of a sidelink synchronization signal may be improved. In addition, the reliability and transmission rate of the sidelink feedback information may be improved. Moreover, the amount of interference caused to the cellular system by the sidelink system may be reduced. Therefore, an embodiment of the disclosure may support efficient sidelink communication. Moreover, a service may be effectively provided in a mobile communication system.

FIGS. 1A to 1D are views illustrating a sidelink system according to various embodiments of the disclosure.

Referring to FIG. 1A, it illustrates an example when all sidelink terminals UE-1 and UE-2 are located under coverage of a base station.

All the sidelink terminals UE-1 and UE-2 may receive data and control information from the base station through a downlink (DL) or transmit data and control information to the base station through an uplink (UL). In this case, the data and the control information may be data and control information for sidelink communication. Alternatively, the data and the control information may be data and control information for general cellular communication. The sidelink terminals may transmit/receive the data and the control information for sidelink communication through a sidelink (SL).

Figure 1B:
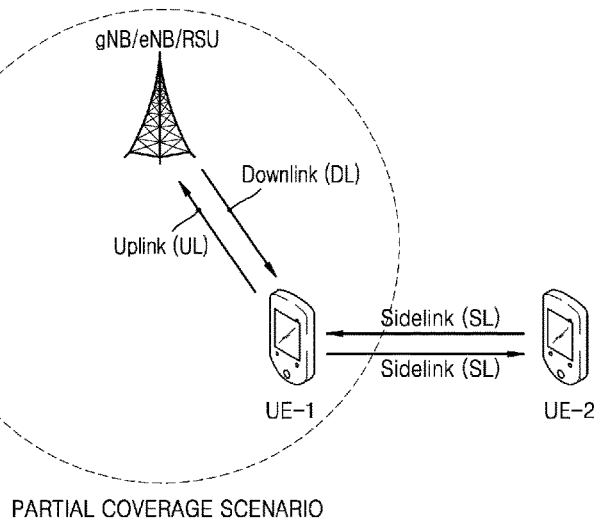
FIG. 1B illustrates an operation where among sidelink terminals, one user equipment (UE) is located under coverage of a base station and another UE is located outside a coverage of the base station according to an embodiment of the disclosure.

Referring to FIG. 1B, it illustrates an example where among the sidelink terminals, UE-1 is located under the coverage of the base station and UE-2 is located outside the coverage of the base station. An example according to FIG. 1B may be regarded as an example regarding a partial coverage.

UE-1 located within the coverage of the base station may receive data and control information from the base station through a DL or transmit data and control information to the base station through an UL.

UE-2 located outside the coverage of the base station may not be able to receive the data and the control information from the base station through the DL, and may not be able to transmit the data and the control information to the base station through the UL.

UE-2 may transmit and receive the data and the control information for sidelink communication to and from UE-1 through the SL.

Figure 1C:
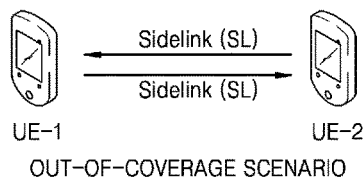
FIG. 1C illustrates an operation of a case in which all sidelink terminals are located outside coverage of a base station according to an embodiment of the disclosure.

Referring to FIG. 1C, it illustrates an example of a case in which all sidelink terminals are located outside the coverage of the base station.

Thus, UE-1 and UE-2 may not be able to receive the data and the control information from the base station through the DL, and may not be able to transmit the data and the control information to the base station through the UL.

UE-1 and UE-2 may transmit and receive the data and the control information for sidelink communication through the SL.

Figure 1D:
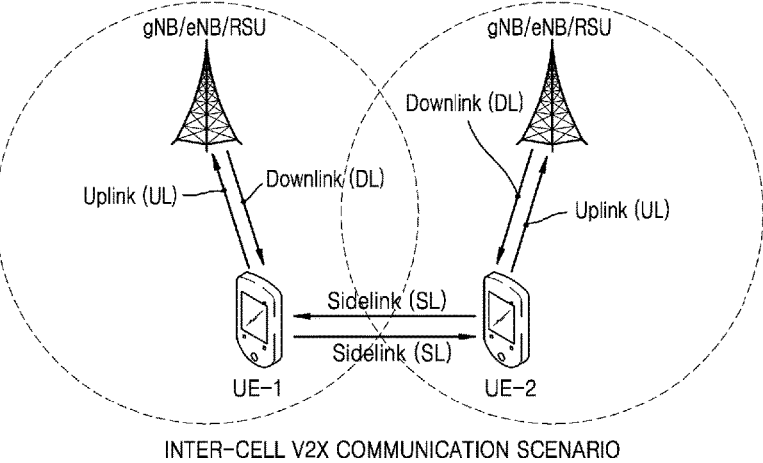
FIG. 1D illustrates an operation of a scenario where vehicle-to-everything (V2X) communication is performed between terminals located in different cells according to an embodiment of the disclosure.

Referring to FIG. 1D, it shows an example of a scenario where sidelink communication (or V2X communication) is performed between terminals located in different cells. More specifically, FIG. 1D shows a case where an SL transmission terminal and an SL reception terminal are connected to different base stations (a radio resource control (RRC) connected state) or camp on different base stations (an RRC disconnected state, i.e., an RRC idle state). In this case, UE-1 may be a sidelink transmission terminal and UE-2 may be a sidelink reception terminal. Alternatively, UE-1 may be a sidelink reception terminal and UE-2 may be a sidelink transmission terminal UE-1 may receive an SL dedicated system information block (SIB) from a base station to which UE-1 is connected (or on which UE-1 camps), and UE-2 may receive the sidelink dedicated SIB from another base station to which UE-2 is connected (or on which UE-2 camps). In this case, information of the sidelink dedicated SIB received by UE-1 and information of the sidelink dedicated SIB received by UE-2 may be different from each other. Thus, to perform sidelink communication between terminals located in different cells, the information needs to be standardized.

Although FIGS. 1A to 1D show a sidelink system including two terminals UE-1 and UE-2 for convenience of description, the disclosure is not limited thereto. An UL and a DL between the base station and the sidelink terminals may be referred to as a Uu interface, and a sidelink between sidelink terminals may be referred to as a PC5 interface. Thus, in the disclosure, UL and a DL between the base station and the sidelink terminals and the Uu interface may be interchangeably used. And, the sidelink between sidelink terminals and the PC5 interface may be interchangeably used.

In the disclosure, a terminal may mean a terminal supporting D2D communication, a vehicle supporting V2V communication, a vehicle or a pedestrian's handset (i.e., smartphone) supporting V2P communication, or a vehicle supporting V2N communication, or a vehicle supporting V2I communication. In the disclosure, the terminal may also refer to an RSU having a terminal function, an RSU having a base station function, an RSU having a part of the terminal function and a part of the base station function.

In addition, in the disclosure, the base station may be a base station supporting both sidelink communication and general cellular communication or a base station supporting sidelink communication. In this case, the base station may mean a 5G base station (gNB), a 4G base station (evolved NodeB, (eNB)), or an RSU. Thus, unless mentioned otherwise in the disclosure, the base station and the RSU may be used as the same concept and thus may be used interchangeably.

Figure 2A:
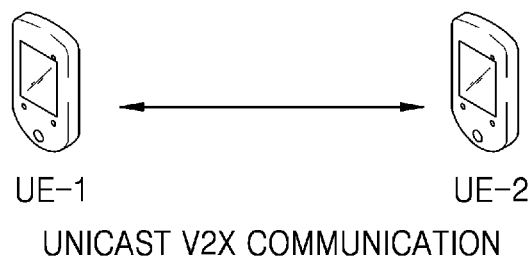
FIG. 2A illustrates an operation of a unicast V2X communication according to an embodiment of the disclosure.
Figure 2B:
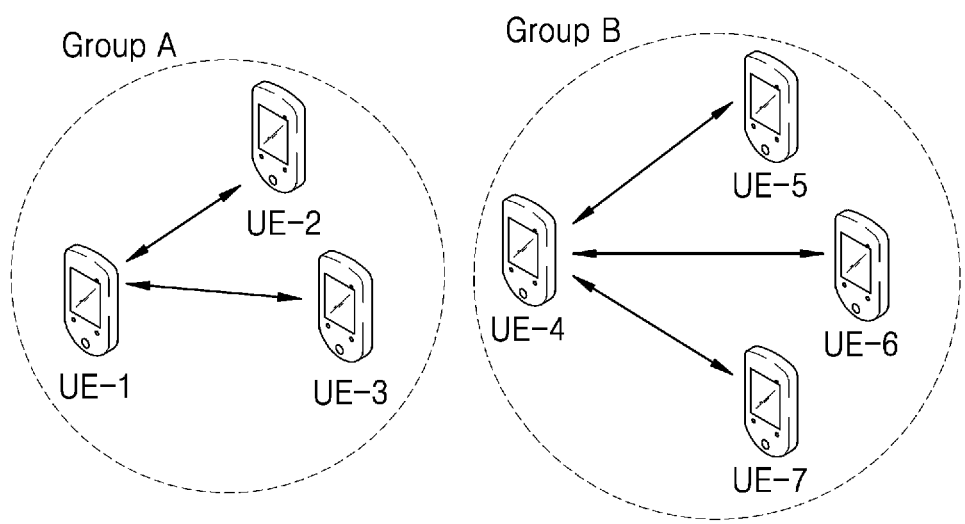
FIG. 2B illustrates an operation of a groupcast V2X communication according to an embodiment of the disclosure.

FIGS. 2A and 2B are views illustrating a method of sidelink communication performed through a sidelink according to various embodiment of the disclosure.

Referring to FIG. 2A, a transmission (TX) terminal and a reception (RX) terminal may perform one-to-one communication, which may be referred to as unicast communication (or unicast V2X communication or unicast SL communication). For example, when UE-1 is a TX terminal, UE-2 may be an RX terminal. Alternatively, when UE-2 is a TX terminal, UE-1 may be an RX terminal.

Referring to FIG. 2B, the TX terminal and the RX terminal may perform one-to-many communication, which may be referred to as groupcast or multicast communication (or groupcast V2X communication or groupcast SL communication).

It is illustrated in FIG. 2B that UE-1, UE-2, and UE-3 form one group (group A) to perform groupcast communication, and UE-4, UE-5, UE-6, and UE-7 form another group (group B) to perform groupcast communication. Each terminal may perform groupcast communication in a group to which the terminal belongs, and may perform communication between different groups through unicast, groupcast, or broadcast communication. FIG. 2B shows that two groups are formed, but the disclosure is not limited thereto.

Meanwhile, although not shown in FIGS. 2A and 2B, sidelink terminals may perform broadcast communication. The broadcast communication may mean a case where all sidelink terminals receive data and control information transmitted by a sidelink transmission terminal through a sidelink. For example, when UE-1 is assumed to be a transmission terminal for broadcast communication in FIG. 2B, all of the terminals UE-2, UE-3, UE-4, UE-5, UE-6, and UE-7 may receive data and control information transmitted by UE-1.

Figure 3:
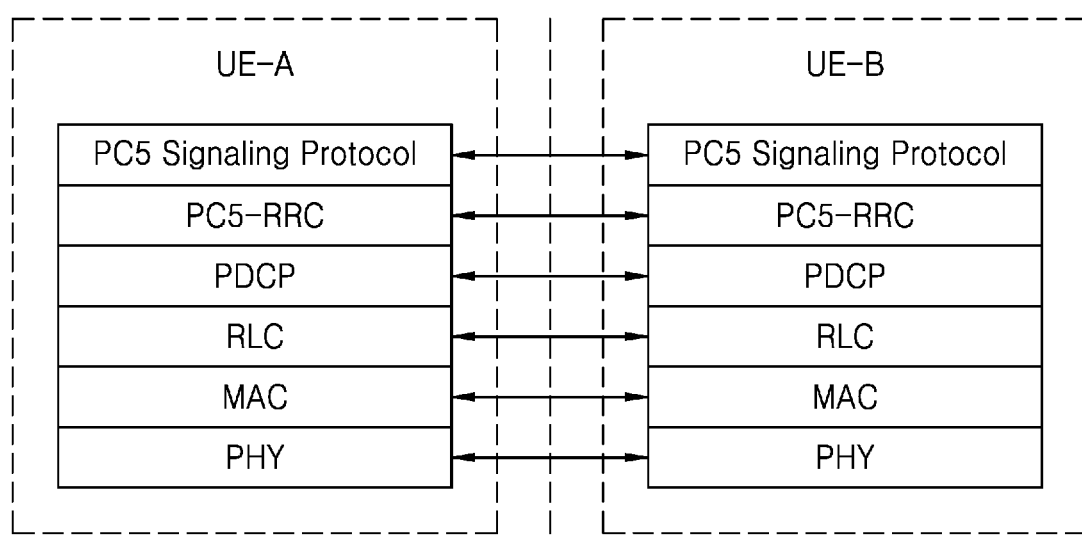
FIG. 3 illustrates a protocol of a sidelink terminal according to an embodiment of the disclosure.

FIG. 3 is a diagram illustrating a protocol of a sidelink terminal according to an embodiment of the disclosure.

Although not shown in FIG. 3, application layers of a terminal-A UE-A and a terminal-B UE-B may perform service discovery. In this case, the service discovery may include discovery regarding which sidelink communication scheme (unicast, groupcast, or broadcast communication) is to be performed by each terminal. Thus, referring to FIG. 3, it may be assumed that the terminal-A UE-A and the terminal-B UE-B recognize, through service discovery performed in the application layers, that unicast communication is to be performed. Sidelink terminals may obtain information about a source identifier (ID) and a destination ID for sidelink communication in the foregoing service discovery.

Upon completion of service discovery, a PC5 signaling protocol layer shown in FIG. 3 may perform a terminal-to-terminal direct link connection setup procedure. In this case, the PC5 signaling protocol layer may exchange security configuration information for terminal-to-terminal direct communication.

Upon completion of terminal-to-terminal direct link connection setup, a terminal-to-terminal PC5 RRC setup procedure may be performed in the PC5 RRC layer shown in FIG. 3. At this time, information about a capability of the terminal-A UE-A and information about a capability of the terminal-B UE-B may be exchanged, and access stratum (AS) layer parameter information for unicast communication may be exchanged. In this case, the information about the capabilities of terminals negotiated between the terminals through PC5 RRC may be a sub-set of information used in capability negotiation between the base station and the terminal. For example, the sidelink terminal may be assumed to report information A, B, C, and D about its capability to the base station. In this case, the sidelink terminal may negotiate a part of the information through PC5 RRC.

Upon completion of the PC5 RRC setup procedure, the terminal-A UE-A and the terminal-B UE-B may perform unicast communication.

While the foregoing description has been made using unicast communication as an example, this may extend to groupcast communication. For example, when the terminal-A UE-A, the terminal-B UE-B, and a terminal-C UE-C that is not shown in FIG. 3 perform groupcast communication, the terminal-A UE-A and the terminal-B UE-B may perform service discovery, terminal-to-terminal direct link setup, and PC5 RRC setup, for unicast communication, as described above. The terminal-A UE-A and the terminal-C UE-C may also perform service discovery, terminal-to-terminal direct link setup, and PC5 RRC setup, for unicast communication. The terminal-B UE-B and the terminal-C UE-C may also perform service discovery, terminal-to-terminal direct link setup, and PC5 RRC setup, for unicast communication. For example, a PC5 RRC setup procedure for unicast communication, instead of a separate PC5 RRC setup procedure for groupcast communication, may be performed in each pair of a transmission terminal and a reception terminal that join groupcast communication.

Figure 4:
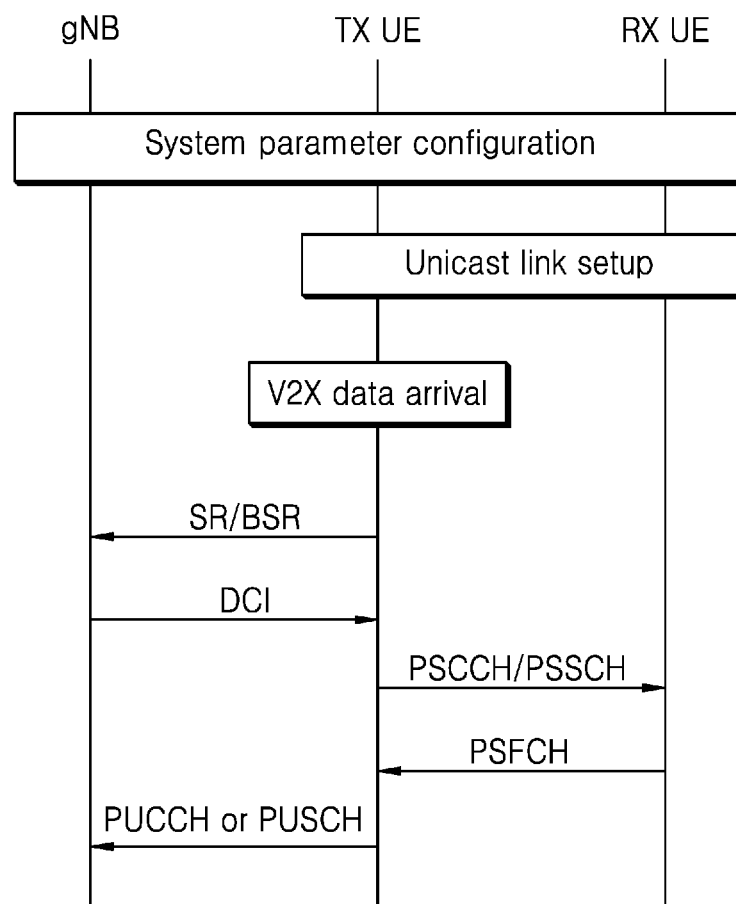
FIG. 4 illustrates a sidelink unicast communication procedure according to an embodiment of the disclosure.

FIG. 4 is a diagram illustrating a sidelink unicast communication procedure according to an embodiment of the disclosure.

More specifically, FIG. 4 is a diagram for describing a sidelink communication procedure based on mode 1 resource allocation described with reference to FIG. 2A.

Referring to FIG. 4, a base station (e.g., eNB/gNB/RSU) may configure a transmission terminal (TX-UE) and a reception terminal (RX-UE) in a cell with a parameter for sidelink communication through system information. For example, the base station (gNB) may configure information about a resource pool with which sidelink communication may be performed in a cell of the base station. In this case, the resource pool may indicate a transmission resource pool for sidelink transmission or a reception resource pool for sidelink reception. A sidelink terminal may be configured with information about one or more resource pools by the base station. The base station may configure unicast communication, groupcast communication, and broadcast communication to be performed in different resource pools through the system information. For example, a resource pool 1 may be used in unicast communication, a resource pool 2 may be used in groupcast communication, and a resource pool 3 may be used in broadcast communication. In another example, the base station may configure unicast communication, groupcast communication, and broadcast communication to be performed in the same resource pool. In another example, the base station may configure different resource pools based on whether a resource of a physical sidelink feedback channel (PSFCH) for transmitting SL feedback information exists in a resource pool. More specifically, the PSFCH resource may exist in the resource pool 1 and may not exist in the resource pool 2. In this case, SL unicast and groupcast data that require hybrid automatic repeat and request (HARQ) feedback may use the resource pool 1, and SL unicast and groupcast data and broadcast data that do not require HARQ feedback may use the resource pool 2.

Resource pool information configured by the base station may include at least one of the following information:

1. Information about a time domain resource of a resource pool: this information may include an index of a slot in which a physical sidelink control channel (PSCCH), a physical sidelink shared channel (PSSCH), and a physical sidelink feedback channel (PSFCH) are to be transmitted or the index of the slot in which the PSCCH, the PSSCH, and the PSFCH are to be transmitted and an index of a corresponding symbol in the slot. The information may also include a period of a resource in which the PSCCH, the PSSCH, and the PSFCH are transmitted.

2. Information about a frequency domain resource of a resource pool: this information may mean information about a frequency axis in a resource pool in which the PSCCH, the PSSCH, and the PSFCH may be transmitted, and more specifically, may include an index of a resource block constituting the resource pool or an index of a sub-channel including two or more resource blocks.

3. Information about whether SL HARQ-acknowledgement (ACK) is used may be included in resource pool configuration information.

(1) When SL HARQ-ACK is used, at least one of the following information may be included:

(1-1) Maximum Retransmission Count (1-2) HARQ-ACK timing: this may mean a time from when an SL reception terminal receives SL control information and data information from an SL transmission terminal to when the SL reception terminal transmits HARQ-ACK/negative ACK (NACK) information regarding the sidelink control information and data information to the SL transmission terminal. In this case, a unit of the time may be a slot or one or more orthogonal frequency division multiplexing (OFDM) symbols.

(1-3) PSFCH format or HARQ feedback method: When two or more PSFCH formats are used, one PSFCH format may be used to transmit HARQ-ACK/NACK information consisting of one bit or two bits. Another PSFCH format may be used to transmit HARQ-ACK/NACK information consisting of 3 or more bits. Meanwhile, when the HARQ-ACK/NACK information is transmitted through the PSFCH, ACK information and NACK information may be transmitted through the PSFCH, respectively. In this case, when the SL reception terminal succeeds in decoding of the PSSCH transmitted from the SL transmission terminal, the SL reception terminal may transmit an ACK through the PSFCH. When the SL reception terminal fails in the decoding, the SL reception terminal may transmit the NACK through the PSFCH. In another example, the SL reception terminal may not transmit an ACK when succeeding in decoding of the PSSCH transmitted from the SL transmission terminal, and may transmit a NACK through the PSFCH only when failing in the decoding. On the other hand, when one PSFCH format is used, information about the above-described HARQ feedback method (whether ACK information and NACK information are to be transmitted through the PSFCH, respectively, or NACK information is to be transmitted through the PSFCH) may be included.

(1-4) Time/frequency/code resource constituting a PSFCH or a set of resources: a time resource may include an index of a slot or a symbol and a period in which the PSFCH is transmitted. A frequency resource may include a frequency block (resource block (RB)) in which the PSFCH is transmitted or a start point and an end point (or a start point and a length of the frequency resource) of a sub-channel including two or more consecutive blocks.

4. Information about Whether Blind Retransmission is Used May be Included in Resource Pool Configuration Information.

Blind retransmission may mean that, unlike in HARQ-ACK/NACK-based retransmission, a transmission terminal repeatedly performs transmission without receiving feedback information regarding an ACK or a NACK from a reception terminal. When blind retransmission is used, the blind retransmission count may be included in resource pool information. For example, when the blind retransmission count is configured to 4, the transmission terminal may transmit identical information four times at all times when the transmission terminal transmits a PSCCH/PSSCH to the reception terminal. In this case, a redundancy version (RV) value may be included in SL control information (SCI) transmitted through the PSCCH.

5. Information about a Demodulation Reference Signal (DMRS) Pattern Available in a PSSCH Transmitted in a Corresponding Resource Pool The DMRS pattern available in the PSSCH may vary with a speed of a terminal. For example, for a high speed of a terminal, to improve the accuracy of channel estimation, the number of OFDM symbols used in DMRS transmission in a time domain needs to be increased. For a low speed of the terminal, as the accuracy of channel estimation may be guaranteed even with a small number of DMRS symbols, the number of OFDM symbols used in DMRS transmission in the time axis needs to be reduced so as to reduce a DMRS overhead. Thus, information about a resource pool may include information about a DMRS pattern available in the resource pool. In this case, two or more DMRS patterns may be configured in one resource pool, and the sidelink transmission terminal may select and use one from among DMRS patterns configured based on a speed of the sidelink transmission terminal. The SL transmission terminal may also transmit information about the DMRS pattern selected by the SL transmission terminal to the SL reception terminal through SCI of the PSCCH. The SL reception terminal may obtain DMRS pattern information by receiving the information, perform channel estimation for the PSSCH, and obtain SL data information by performing demodulation and decoding.

6. Whether an SL Channel State Information Reference Signal (CSI-RS) is Used (1) When the SL CSI-RS is used, at least one of the following information may be included:

(1-1) CSI-RS Transmission Start Point: this may indicate a start point at which the SL transmission terminal has to transmit a CSI-RS to the SL reception terminal. This start point may refer to an index of a slot in which the CSI-RS is to be transmitted, an index of a symbol in which the CSI-RS is to be transmitted, or both the index of the slot and the index of the symbol.

(1-2) CSI reporting timing: this may mean a time from a point in time when, i.e., an index of a slot or an index of a symbol in the slot in which, the SL reception terminal receives the CSI-RS from the SL transmission terminal, to a point in time when, i.e., an index of a slot of an index of a symbol in the slot in which, the SL reception terminal transmits a CSI report to the SL transmission terminal. In this case, a unit representing the time may be a slot or one or more OFDM symbols.

7. Parameter for SL Transmission Power Control (1) For SL transmission power control, an SL pathloss estimation value may be required. In addition, when an Uu carrier and an SL carrier of a base station are the same as each other, SL transmission power control may operate based on a DL pathloss estimation value to reduce interference caused, by sidelink transmission, to an UL signal received by a base station reception end. To this end, the base station may configure whether the SL transmission terminal needs to configure an SL transmission power based on an SL pathloss estimation value, whether the sidelink transmission terminal needs to configure the SL transmission power based on a DL pathloss estimation value, or whether the SL transmission terminal needs to configure the SL transmission power based on both the SL pathloss estimation value and the DL pathloss estimation value. For example, when the base station configures a synchronization signal block SSB or a DL CSI-RS as a signal that has to be used for pathloss estimation, the terminal may configure the SL transmission power based on the DL pathloss estimation value. When the base station configures an SL DMRS or an SL CSI-RS as a signal that has to be used for pathloss estimation, the terminal may configure the SL transmission power based on the SL pathloss estimation value.

(2) As described above, according to a signal to be used for pathloss estimation, a terminal may be configured with different transmission power parameters.

While the foregoing description has been made using an example in which the above-described information is included in a resource pool configuration for SL communication, the disclosure is not limited to the foregoing description. For example, the above-described information may be configured for the SL transmission terminal or the SL reception terminal independently of the resource pool configuration.

Referring to FIG. 4, when data (or V2X data or SL data) to be transmitted from the SL transmission terminal to the SL reception terminal is generated, the SL transmission terminal may request the base station for an SL resource to be transmitted to the SL reception terminal, by using a scheduling request (SR) or/and a buffer status report (BSR). The base station having received the BSR may identify that the SL transmission terminal has data for SL transmission, and determine a resource required for SL transmission, based on the BSR.

According to an embodiment of the disclosure, the base station may transmit an SL scheduling grant including at least one of resource information for SCI transmission, resource information for SL data transmission, or resource information for SL feedback transmission to the SL transmission terminal. The SL scheduling grant, which is information for granting dynamic scheduling in an SL, may be downlink control information (DCI) transmitted on a physical downlink control channel (PDCCH). The SL scheduling grant may include information indicating a bandwidth part (BWP) in which SL transmission is performed and a carrier indicator field (CIF) or a carrier frequency indicator in which SL transmission is performed for an NR base station, and may include the CIF for an LTE base station. The SL scheduling grant may further include resource allocation information of a PSFCH in which feedback information regarding SL data, i.e., ACK/NACK information is transmitted. When SL transmission corresponds to groupcast transmission, the resource allocation information may include information for allocating a plurality of PSFCHs to a plurality of terminals in a group. The resource allocation information of the feedback information may be information indicating at least one of a plurality of feedback information resource candidate sets configured by higher layer signaling.

According to an embodiment of the disclosure, the SL transmission terminal having received the SL scheduling grant may transmit the SCI for scheduling the SL data to the SL reception terminal on the PSCCH in response to the sidelink scheduling grant, and transmit the SL data on the PSSCH. The SCI may include at least one of resource allocation information used in SL data transmission, modulation and coding scheme (MCS) information applied to the SL data, group destination ID information, source ID information, unicast destination ID information, power control information for controlling SL power, timing advance (TA) information, DMRS configuration information for SL transmission, e.g., information about the number of repeated packet transmissions, resource allocation information corresponding to repeated packet transmissions, a redundancy version (RV), or an HARQ process ID. The SCI may further include information indicating a resource in which feedback information regarding SL data, i.e., ACK/NACK information is transmitted.

According to an embodiment of the disclosure, the reception terminal having received the SCI may receive SL data. Thereafter, the SL reception terminal may transmit ACK/NACK information indicating a success or a failure in decoding of SL data to the SL transmission terminal on a PSFCH. The transmission of the feedback information for the SL may be applied to unicast transmission or groupcast transmission, without excluding broadcast transmission. When SL transmission corresponds to groupcast transmission, terminals each having received groupcast data may transmit feedback information by using different PSFCH resources. Alternatively, terminals each having received the groupcast data may transmit feedback information by using an identical PSFCH resource, and in this case, may feedback NACK information. For example, a terminal having received the data may not perform a feedback operation for an ACK. In this case, the PSFCH resource may include not only a resource identified in a time domain or/and a frequency domain, but also a resource identified using a code, such as a scrambling code, an orthogonal cover code, and the like, and a resource identified using a different sequence and a cyclic shift applied to the different sequence.

According to an embodiment of the disclosure, the base station may configure, by using system information or RRC, the SL transmission terminal to report an HARQ feedback received from the SL reception terminal. In this case, the SL transmission terminal may transmit an SL HARQ feedback received from the SL reception terminal to the base station through a PUCCH or a PUSCH. The base station may configure whether the SL transmission terminal is able to multiplex and transmit SL HARQ feedback information received from the SL reception terminal and UCI for existing Uu.

According to an embodiment of the disclosure, when the base station does not configure the SL transmission terminal to multiplex the SL HARQ feedback information and the UCI, the SL transmission terminal is not able to multiplex the SL HARQ feedback information and the UCI for the Uu and transmit them through one PUCCH. In this case, the base station may independently configure a PUCCH for transmitting the SL HARQ feedback information and a PUCCH for transmitting the UCI. For example, a PUCCH in which the SL HARQ feedback information is transmitted may exist independently, and any UCI may not be transmitted in the PUCCH.

On the other hand, when the base station configures to multiplex the SL HARQ feedback information and the UCI, the SL transmission terminal may multiplex the SL HARQ feedback information and the UCI and transmit them through one PUCCH. Assuming the SL HARQ feedback information to be of N1 bits and the UCI to be of N2 bits, the order of multiplexing may follow N2+N1 (i.e., the SL HARQ feedback information is multiplexed after the UCI). When a code rate for a sum of SL HARQ feedback bits and UCI bits transmitted through the PUCCH by being multiplexed is greater than a code rate configured by the base station, the SL transmission terminal may give up transmitting the SL HARQ feedback information (i.e., drop the SL HARQ feedback information).

FIG. 4 assumes a scenario in which the SL transmission terminal is in a state of being UL-connected to the base station (i.e., the RRC-connected state), and both the SL transmission terminal and the SL reception terminal exist under coverage of the base station. Although not shown in FIG. 4, when the SL transmission terminal has not configured UL connection to the base station (i.e., an RRC idle state), the SL transmission terminal may perform a random access procedure for UL connection setup with the base station. Although not shown in FIG. 4, in a scenario in which the SL transmission terminal exists in the coverage of the base station and the SL reception terminal exists outside the coverage of the base station, the SL reception terminal may be preconfigured with information for SL communication and then use the preconfigured information. Meanwhile, as shown in FIG. 4, the SL transmission terminal may be configured with the information for SL communication by the base station. In an embodiment of the disclosure, when both the SL transmission terminal and the SL reception terminal exist outside the coverage of the base station, the SL transmission terminal and the SL reception terminal may be preconfigured with the information for SL communication and then use the preconfigured information. In this case, when the terminal or the base station is preconfigured, it may mean that the terminal or the base station uses a value embedded in the terminal at the time of release of the terminal. In another example, the pre-configuration may include using information obtained most recently, in case that the SL transmission terminal or the SL reception terminal has ever obtained the information for SL communication through RRC setup by connecting to the base station or has ever obtained the information for SL communication through system information of the base station.

Although not shown in FIG. 4, it may be assumed that before the SL transmission terminal transmits an SR/BSR to the base station, the SL transmission terminal has completed service discovery, a terminal-to-terminal direct link connection setup procedure, and a PC5 RRC setup procedure with the SL reception terminal through the procedure mentioned with reference to FIG. 3.

Figure 5:
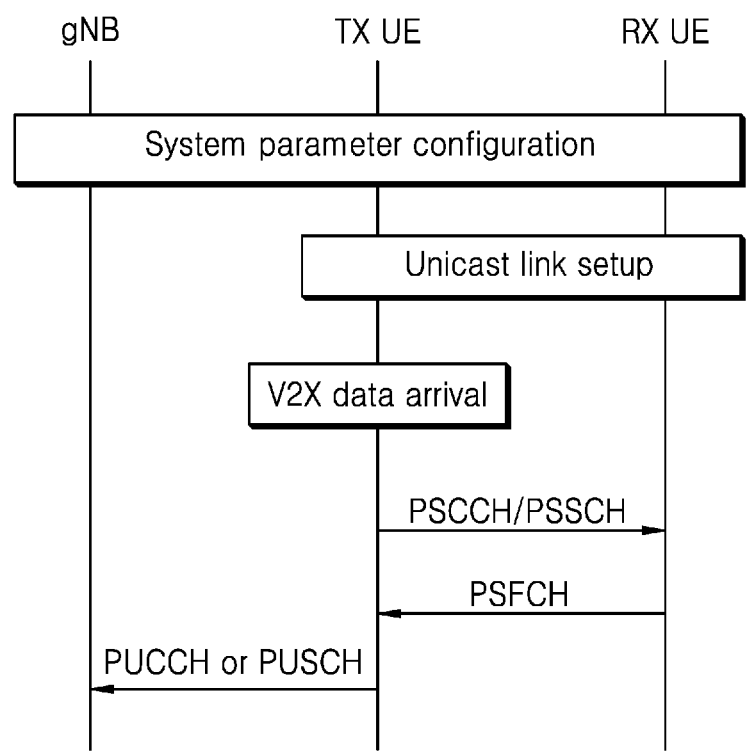
FIG. 5 illustrates a sidelink unicast communication procedure according to an embodiment of the disclosure.

FIG. 5 illustrates a sidelink unicast communication procedure according to an embodiment of the disclosure.

More specifically, FIG. 5 shows an SL communication procedure based on mode 2 resource allocation described with reference to FIG. 2B. In FIG. 5, a base station (gNB) may configure SL transmission and reception terminals (TX-UEs and RX-UEs) in a cell with a parameter for SL communication through system information. The parameter may include at least one of parameter information described with reference to FIG. 4.

Referring to FIG. 5, when data (or V2X data or SL data) to be transmitted to the SL reception terminal is generated in the SL transmission terminal, the SL transmission terminal may transmit SCI to the SL reception terminal on the PSCCH and transmit SL data to the SL reception terminal on the PSSCH. In an embodiment of the disclosure, the SCI may include at least one of resource allocation information used in SL data transmission, MCS information applied to the SL data, group destination ID information, source ID information, unicast destination ID information, power control information for controlling SL power, TA information, DMRS configuration information for SL transmission, information about repeated packet transmissions, e.g., the number of repeated packet transmissions, resource allocation information corresponding to repeated packet transmissions, an RV, or an HARQ process ID. The SCI may further include information indicating a resource in which feedback information regarding SL data (ACK/NACK information) is transmitted.

According to an embodiment of the disclosure, the SL reception terminal having received the SCI may receive SL data. Thereafter, the SL reception terminal may transmit ACK/NACK information indicating a success or a failure in decoding of SL data to the SL transmission terminal on the PSFCH. The transmission of the feedback information for the SL may be applied to unicast transmission or groupcast transmission, without excluding broadcast transmission. When SL transmission corresponds to groupcast transmission, terminals each having received groupcast data may transmit feedback information by using different PSFCH resources. Alternatively, terminals each having received the groupcast data may transmit feedback information by using an identical PSFCH resource, and in this case, may feedback only NACK information (i.e., do not perform a feedback operation when the terminal having received data determines the ACK information). In this case, the PSFCH resource may include not only a resource identified in a time domain or/and a frequency domain, but also a resource identified using a code, such as a scrambling code, an orthogonal cover code, and the like, and a resource identified using a different sequence (and a cyclic shift applied to the different sequence).

Referring to FIG. 4, in FIG. 5, the base station may configure, by using system information or RRC, the SL transmission terminal to report an HARQ feedback received from the SL reception terminal. In this case, the SL transmission terminal may transmit an SL HARQ feedback received from the SL reception terminal to the base station through a PUCCH or a PUSCH. The base station may configure whether the SL transmission terminal is able to multiplex and transmit SL HARQ feedback information received from the SL reception terminal and UCI for existing Uu.

When the base station does not configure the SL transmission terminal to multiplex the SL HARQ feedback information and the UCI, the SL transmission terminal is not be able to multiplex the SL HARQ feedback information and the UCI for the Uu and to transmit them through one PUCCH. In this case, the base station may independently configure a PUCCH for transmitting the SL HARQ feedback information and a PUCCH for transmitting the UCI. For example, a PUCCH in which the SL HARQ feedback information is transmitted may exist independently, and any UCI may not be transmitted through the PUCCH.

On the other hand, when the base station configures to multiplex the SL HARQ feedback information and the UCI, the SL transmission terminal may multiplex the SL HARQ feedback information and the UCI and transmit them through one PUCCH. Assuming the SL HARQ feedback information to be of N1 bits and the UCI to be of N2 bits, the order of multiplexing may follow N2+N1 (i.e., the SL HARQ feedback information is multiplexed after the UCI). When a code rate for a sum of SL HARQ feedback bits and UCI bits transmitted through a PUCCH by being multiplexed is greater than a code rate configured by the base station, the SL transmission terminal may give up transmitting the SL HARQ feedback information (i.e., drop the SL HARQ feedback information).

FIG. 5 is a diagram of a scenario in which it is assumed that all of SL transmission and reception terminals exist within the coverage of the base station according to an embodiment of the disclosure. Although not shown in FIG. 5, FIG. 5 may also be applied to a case where all of the SL transmission and reception terminals exist outside the coverage of the base station. In this case, the SL transmission and reception terminals may be preconfigured with the above-described information for SL communication. Although not shown in FIG. 5, the scenario of FIG. 5 may also be applied to a scenario where one of the SL transmission and reception terminals exists under the coverage of the base station and the other terminal exists outside the coverage of the base station. In this case, a terminal existing under the coverage of the base station may be preconfigured with the information for SL communication by the base station, and a terminal existing outside the coverage of the base station may be preconfigured with the information for SL communication. In this case, the 'information for SL communication' may be interpreted as information about at least one of the parameters for SL communication described above with reference to FIG. 4. When the terminal is preconfigured, it may mean that the terminal uses a value embedded in the terminal at the time of release of the terminal. In another example, the pre-configuration may include using information obtained most recently, in case that the SL transmission terminal or reception terminal has ever obtained the information for SL communication through RRC setup by connecting to the base station or has ever obtained the information for SL communication through system information of the base station.

Although not shown in FIG. 5, it may be assumed that before the SL transmission terminal transmits a PSCCH/PSSCH to the SL reception terminal, the SL transmission terminal has completed service discovery, a direct link connection setup procedure, and a PC5 RRC setup procedure with the SL reception terminal through the procedure mentioned with reference to FIG. 3.

While a description has been made with reference to FIG. 5 by using an example of unicast communication where one SL reception terminal exists, the description may be equally applied to groupcast communication and broadcast communication where two or more SL reception terminals exist.

Figure 6:
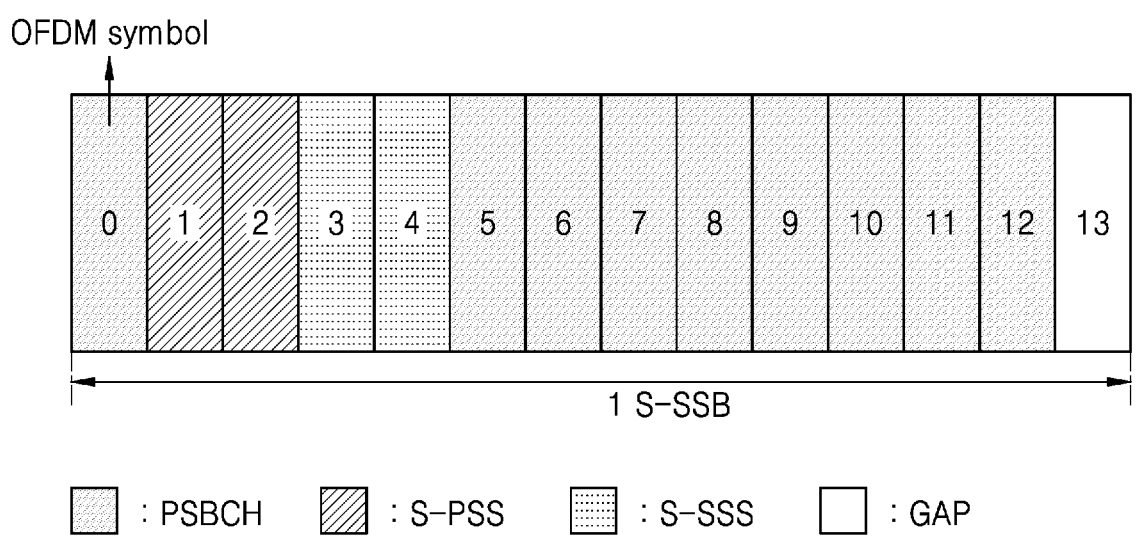
FIG. 6 illustrates a structure of a sidelink synchronization channel according to an embodiment of the disclosure.

FIG. 6 is a diagram illustrating a structure of a sidelink synchronization channel according to an embodiment of the disclosure.

Referring to FIG. 6, the sidelink synchronization channel may be represented as a sidelink synchronization signal block (S-SSB), and one S-SSB may include 14 symbols. One S-SSB may include a sidelink primary synchronization signal (S-PSS), a sidelink secondary synchronization signal (S-SSS), a physical sidelink broadcast channel (PSBCH), and a guard period (GAP). In this case, each of the S-PSS and the S-SSS may include two OFDM symbols, the PSBCH may include nine OFDM symbols, and the GAP may include one OFDM symbol.

In this case, referring to FIG. 6, the S-PSS may be mapped to OFDM symbol indexes 1 and 2, the S-SSS may be mapped to OFDM symbol indexes 3 and 4, and the GAP may be mapped to the last OFDM symbol (i.e., an OFDM symbol index 13) of the S-SSB. The PSBCH may be mapped to other OFDM symbols than the S-PSS, the S-SSS, and the GAP. Although it is illustrated in FIG. 6 that the S-PSS and the S-SSS are located in consecutive symbols, the S-PSS and the S-SSS may be located spaced apart from each other with one symbol therebetween. For example, the S-PSS may be mapped to the OFDM symbol indexes 1 and 2, the S-SSS may be mapped to the OFDM symbol indexes 4 and 5, and the PSBCH may be mapped to the OFDM symbol indexes 0, 3, 6, 7, 8, 9, 10, 11, 12, and 13. Although not shown in FIG. 6, a DMRS may be transmitted in each of OFDM symbols to which the PSBCH is mapped.

Figure 7:
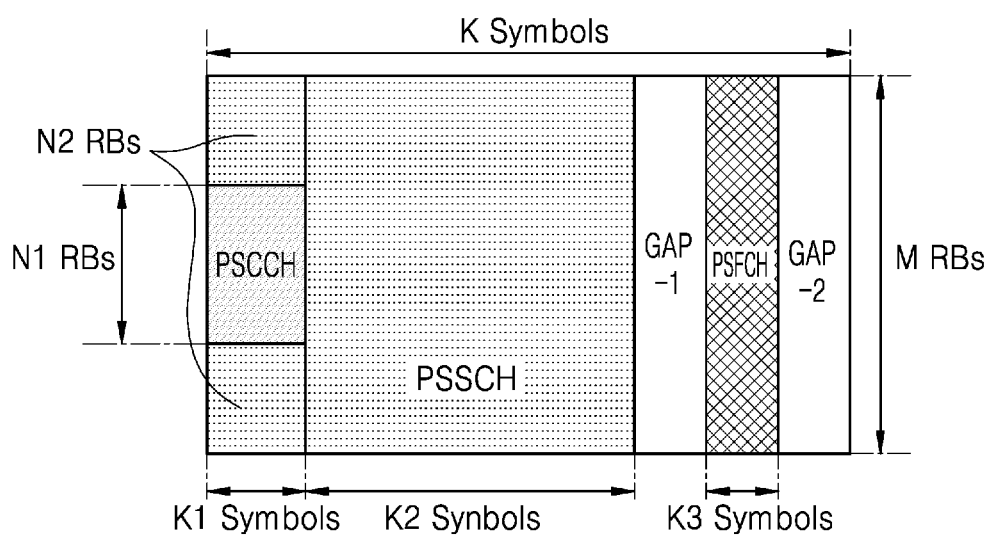
FIG. 7 illustrates a structure of a sidelink control channel and a sidelink data channel according to an embodiment of the disclosure.

FIG. 7 illustrates a structure of a sidelink control channel and a sidelink data channel according to an embodiment of the disclosure.

Referring to FIG. 7, a PSCCH may include K1 symbols and N1 RBs. In a PSSCH, K1 symbols may include N2 RBs and the other K2 symbols may include M RBs. Meanwhile, it is illustrated in FIG. 7 that a PSFCH includes K3 symbols and M RBs and the number of RBs of the PSSCH is equal to the number of RBs of the PSFCH. However, a resource size on the frequency axis of the PSFCH may be smaller than the number of RBs of the PSSCH. For example, the PSSCH may include ten RBs, and the PSFCH may include one RB.

Referring to FIGS. 7, K1 and K2 may be equal to or different from each other. When K1 and K2 are different from each other, K1>K2 or K1<K2. In an embodiment of the disclosure, K1+K2+guard symbol 1+K3+guard symbol 2≤K, and guard symbol 1 and guard symbol 2 may include one OFDM symbol or two or more OFDM symbols. In this case, the guard symbol 1 and the guard symbol 2 may include OFDM symbols having different lengths. For example, the guard symbol 1 may include two OFDM symbols and the guard symbol 2 may include one OFDM symbol.

According to an embodiment of the disclosure, a sidelink transmission terminal may transmit SCI through the PSCCH including the K1 symbols on the time axis and the N2 frequency blocks on the frequency axis, as shown in FIG. 7. The SCI may be transmitted including time/frequency allocation information of the PSSCH including (K1+K2) symbols on the time axis and M frequency blocks on the frequency axis. The SL reception terminal may receive and decode the PSCCH transmitted from the transmission terminal and then obtain time/frequency allocation information of the PSSCH and decode the PSSCH. It is illustrated in FIG. 7 that the PSSCH including the K2 symbols is physically continuously located after K1 symbols of the PSCCH, but may not be physically continuous (i.e., may be logically continuously located and may be physically discontinuous).

According to an embodiment of the disclosure, in FIG. 7, guard symbol 1 GAP-1 may be used by an SL transmission terminal to transmit the PSCCH and the PSSCH to one or more SL reception terminals and to receive the PSFCH from the one or more SL reception terminals. For example, the guard symbol 1 GAP-1 may be a period necessary for switching between PSCCH/PSSCH transmission and PSFCH reception in light of the SL transmission terminal, and a period necessary for switching between PSCCH/PSSCH reception and PSFCH transmission in light of the SL reception terminal.

Meanwhile, unlike an SL slot structure shown in FIG. 7, a slot where the PSFCH does not exist may be considered. In this case, the SL slot may include K1 frequency-division-multiplexed PSCCH/PSSCH symbols, K2 PSSCH symbols, and a guard symbol GAP-2 located at the end of the slot. For example, among the K symbols of the SL slot, the other symbols (i.e., K−(K1+1) symbols, and in this case, the number of symbols of the guard symbol GAP-2 is assumed to be 1) than the K1 frequency-division-multiplexed PSCCH/PSSCH symbols, may be used by the SL transmission terminal for PSSCH transmission.

Meanwhile, it is illustrated in FIG. 7 that the PSCCH is located in the middle of the SL slot on the frequency axis, but the disclosure is not limited thereto. For example, the PSCCH may include N1 RBs based on the lowest RB index or the highest RB index.

Figure 8:
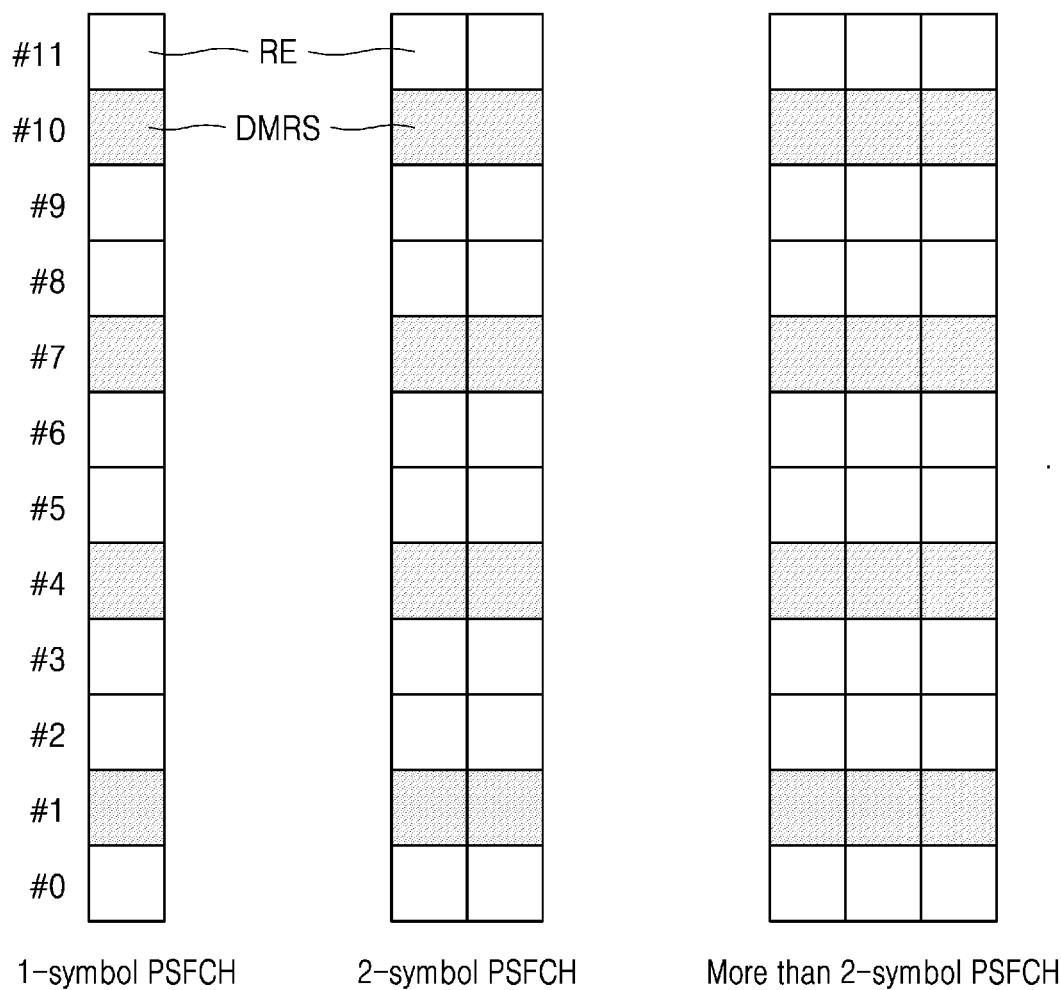
FIG. 8 illustrates a structure of a sidelink feedback channel according to an embodiment of the disclosure.

FIG. 8 illustrates a structure of a sidelink feedback channel according to an embodiment of the disclosure.

FIG. 8 illustrates a structure of one sidelink feedback channel (PSFCH) that may be transmitted by one (SL) reception terminal, in which the PSFCH may be used to transmit SL HARQ feedback information described in FIGS. 4 and 5.

Referring to FIG. 8, a DMRS overhead is assumed to be, without being limited to, ⅓ (i.e., four resource elements (REs) among twelve REs are used for a DMRS). For example, when the DMRS overhead is ¼ (i.e., three REs among twelve REs is used for a DMRS), the DMRS may be mapped to RE indexes 1, 5, and 9 (or 2, 6, and 10) and the HARQ feedback information may be mapped to the other RE indexes.

While a structure of one PSFCH including one RB (i.e., twelve REs) is illustrated in FIG. 8, the structure may also be equally applied to one PSFCH including two or more RBs. For example, when it is assumed that two RBs are assumed to correspond to a size of a PSFCH frequency resource transmitted by one SL reception terminal, the DMRS may be mapped to RE indexes 1, 4, 7, 10, 13, 16, 19, and 22 and the HARQ feedback information may be mapped to the other RE indexes.

When one PSFCH transmitted by one SL reception terminal includes two or more OFDM symbols on the time axis, the PSFCH including one OFDM symbol may be repeated. For example, when two OFDM symbols are included in the PSFCH or three OFDM symbols are included in the PSFCH, the PSFCH including one OFDM symbol may be repeated as shown in FIG. 8. This principle may also be extended to a structure of a PSFCH including four or more OFDM symbols, though not shown in FIG. 8.

The PSFCH shown in FIG. 8 may be mapped to K3 symbols in the SL slot resource shown in FIG. 7. Although not shown in FIG. 8, HARQ feedback information may be mapped to all REs of the PSFCH without a RE used for DMRS transmission.

Moreover, while it is illustrated in FIG. 8 that the DMRS exists in the same RE on the frequency axis even when the number of OFDM symbols increases, the disclosure is not limited thereto. For example, for a PSFCH including two OFDM symbols, a DMRS RE position in the second OFDM symbol may be different from a DMRS RE position in the first OFDM symbol. Likewise, for a PSFCH including three OFDM symbols, a DMRS RE position in each OFDM symbol may be different. In another example, for a PSFCH including three or more OFDM symbols, DMRS RE positions in at least two OFDM symbols may be the same as each other.

Figure 9:
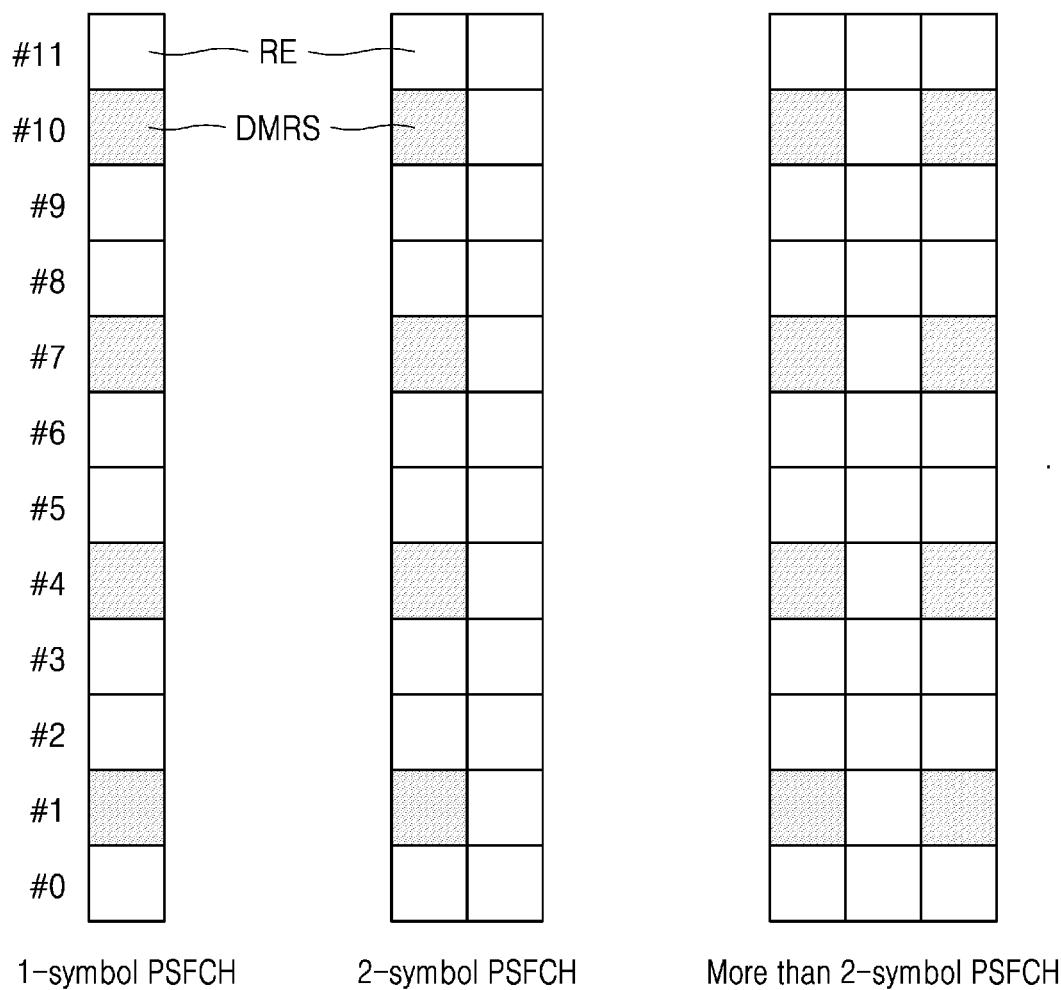
FIG. 9 illustrates a structure of a sidelink feedback channel according to another embodiment of the disclosure.

FIG. 9 illustrates a structure of an SL feedback channel according to another embodiment of the disclosure.

FIG. 9 illustrates a structure of one PSFCH that may be transmitted by one (SL) reception terminal, in which the PSFCH may be used to transmit SL HARQ feedback information described in FIGS. 4 and 5.

Referring to FIG. 9, a DMRS overhead is assumed to be, without being limited to, ⅓ (i.e., four REs among twelve REs are used for a DMRS). For example, when the DMRS overhead is ¼ (i.e., three REs among twelve REs may be used for a DMRS), the DMRS may be mapped to RE indexes 1, 5, and 9 (or 2, 6, and 10) and the SL HARQ feedback information may be mapped to the other RE indexes.

While a structure of one PSFCH including one RB (i.e., twelve REs) is illustrated in FIG. 9 like in FIG. 8, the structure may also be equally applied to one PSFCH including two or more RBs. For example, when it is assumed that two RBs are assumed to correspond to a size of one PSFCH frequency resource transmitted by one SL reception terminal, the DMRS may be mapped to RE indexes 1, 4, 7, 10, 13, 16, 19, and 22 and the SL HARQ feedback information may be mapped to the other RE indexes.

When one PSFCH transmitted by one SL reception terminal includes two or more OFDM symbols on the time axis in FIG. 8, the PSFCH including one OFDM symbols is repeated. However, in an example shown in FIG. 9, a DMRS may exist in an odd-numbered OFDM symbol and a DMRS may not exist in an even-numbered OFDM symbol (i.e., a DMRS may exist in the first and third OFDM symbols and a DMRS may not exist in the second OFDM symbol).

The PSFCH shown in FIG. 9 may be mapped to K3 symbols in the SL slot resource shown in FIG. 7. Although not shown in FIG. 9, SL HARQ feedback information may be mapped to all REs of the PSFCH without a RE (i.e., a DMRS) used for DMRS transmission.

Moreover, while it is illustrated in FIG. 9 that the DMRS exists in the same RE on the frequency axis even when the number of OFDM symbols increases, the disclosure is not limited thereto. For example, for a PSFCH including three OFDM symbols, a DMRS RE position in the third OFDM symbol may be different from a DMRS RE position in the first OFDM symbol. Likewise, for a PSFCH including four or more OFDM symbols, a DMRS RE position in each OFDM symbol where the DMRS exists may be different. In another example, for a PSFCH including four or more OFDM symbols, a DMRS RE position in each of at least two OFDM symbols where the DMRS exists may be different.

Figure 10:
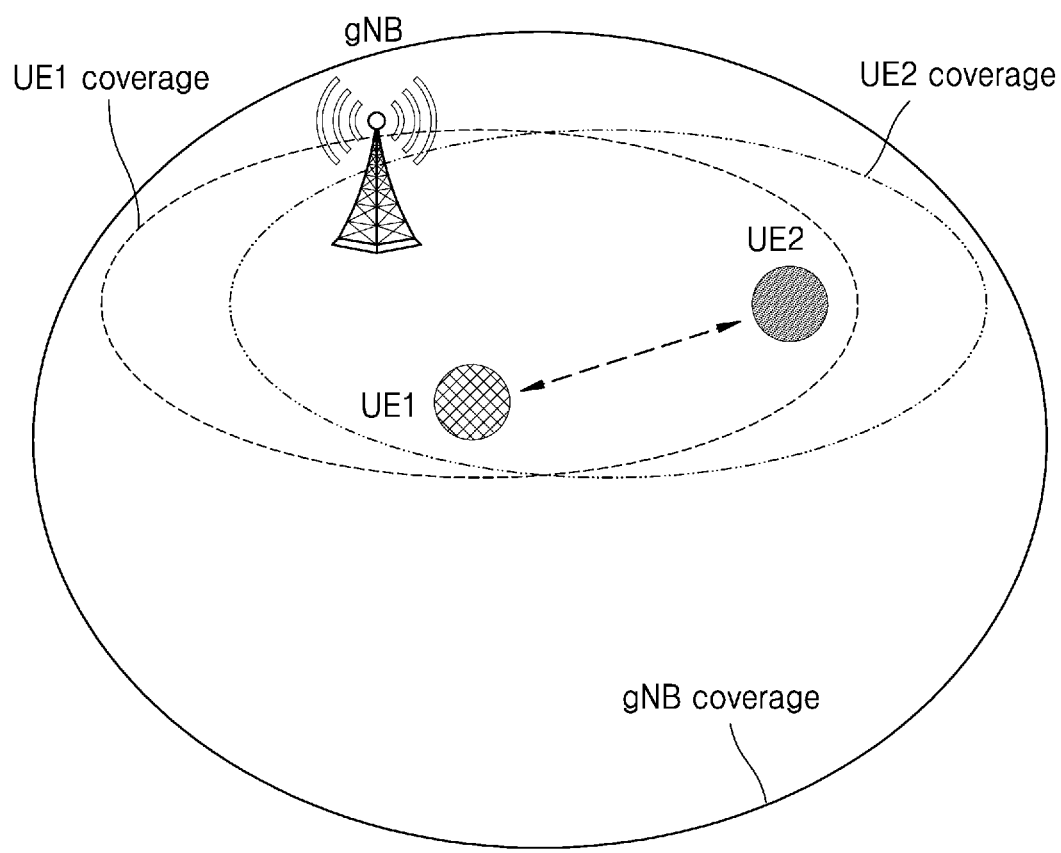
FIG. 10 illustrates an operation of sidelink transmission power control according to an embodiment of the disclosure.

FIG. 10 illustrates an operation of SL transmission power control according to an embodiment of the disclosure.

Referring to FIG. 10, it may be assumed that a terminal UE1 is located close to a base station gNB and a terminal UE2 is located far away from the base station gNB (i.e., the terminal UE1 may be located in the center of a cell and the terminal UE2 may be located in the edge of the cell). The terminals UE1 and UE2 may perform SL communication with each other, in which the terminal UE1 may be assumed to be an SL transmission terminal and the terminal UE2 may be assumed to be an SL reception terminal. In this case, the terminal UE1 may perform SL transmission power control for SL transmission. A parameter for SL transmission power of the terminal UE1 may include at least $P_0$, $\alpha$, a pathloss estimation value, and a size of an allocated frequency block, as given in Equation 1.

$$\text{SL transmission power} = \min\{P_{cmax}, P_{Congestion}, P_0 + \alpha \cdot PL + 10\log_{10}(M \cdot 2^\mu) + \Delta\} \text{ [dBm]} \quad \text{Equation 1}$$

In Equation 1, each parameter may mean the following:

$P_{cmax}$: this may mean a maximum transmission power of a terminal, and may be determined by the terminal based on a P-max value (in the absence of a base station, a preconfigured value) configured through system information or RRC by the base station, a power class of the terminal embedded in the terminal, and the like;

$P_{Congestion}$: this may represent a parameter reflecting the congestion level of the sidelink transmission terminal and may mean a maximum transmission power available to the SL transmission terminal according to a congestion level as a parameter reflecting the congestion level of the SL transmission terminal. More specifically, when the base station determines that a congestion level is high in a resource pool configured by the base station, the base station may transmit $P_{Congestion}$ to the SL transmission terminal through system information or RRC setup. In another example, the SL transmission terminal may be configured with $P_{Congestion}$ in unicast link connection setup through PC-5 RRC. In another example, the SL transmission terminal may use $P_{Congestion}$ included in preconfigured resource pool information. $P_{Congestion}$ may have the unit of [dBm], and range from −41 [dBm] to 31 [dBm] by 1 [dBm]. $P_{Congestion}$ may have a relationship with a priority of an SL channel transmitted by the SL transmission terminal. For example, when the priority of the SL channel transmitted by the SL transmission terminal is high, transmission of the SL channel has to be successfully performed in spite of a high congestion level, such that $P_{Congestion}$ that is configured by the base station or PC-5 RRC or preconfigured may be large (e.g., 31 [dBm]). On the other hand, when the priority of the SL channel transmitted by the SL transmission terminal is low and the congestion level is high, there may be no problem in spite of a failure in transmission of the SL channel (or in spite of abandonment of the transmission), such that $P_{Congestion}$ that is configured by the base station or PC-5 RRC or preconfigured may be small (e.g., −41 [dBm]). The above-described SL channel may include an SL synchronization channel $P_0$: this may mean a value (in the absence of a base station, a preconfigured value) configured through system information or RRC from the base station to guarantee the link quality of the reception terminal.

$\alpha$: this may mean a value between 0 and 1 as a parameter for compensating for pathloss (PL) and may be a value (in the absence of a base station, a preconfigured value) configured through system information or RRC by the base station. For example, for $\alpha=1$, pathloss may be compensated by 100%, and for $\alpha=0.8$, pathloss may be compensated by 80%.

M: this may mean a size of a frequency block allocated for SL transmission. In this case, $2^\mu$ may be a parameter for compensating for a different power spectral density (PSD) according to a subcarrier spacing. For example, when a subcarrier spacing of 15 kHz is used, $\mu=0$. When a subcarrier spacing increases by two times to 30 kHz in spite of the use of the same number of frequency blocks, a PSD may be reduced by a half of a case where a subcarrier spacing of 15 kHz is used. Thus, to compensate for this, the power needs to be increased by two times. More specifically, when two frequency blocks are used, for a subcarrier spacing of 15 kHz, a transmission power of 10 log 10($2\times2^0$)=3 dB is required, but for a subcarrier spacing of 30 kHz, the transmission power needs to be increased to 10 log 10($2\times2^1$)=6 dB to maintain the same PSD as that with a subcarrier spacing of 15 kHz.

PL: this may mean a pathloss estimation value. In this case, a pathloss value may be estimated using Equation 2.

Transmission power of a signal used for pathloss estimation–a reference signal received power (RSRP) measurement value of a signal used for pathloss estimation    Equation 2

Equation 2 may be applied differently according to a scenario as described below.

Figure 11:
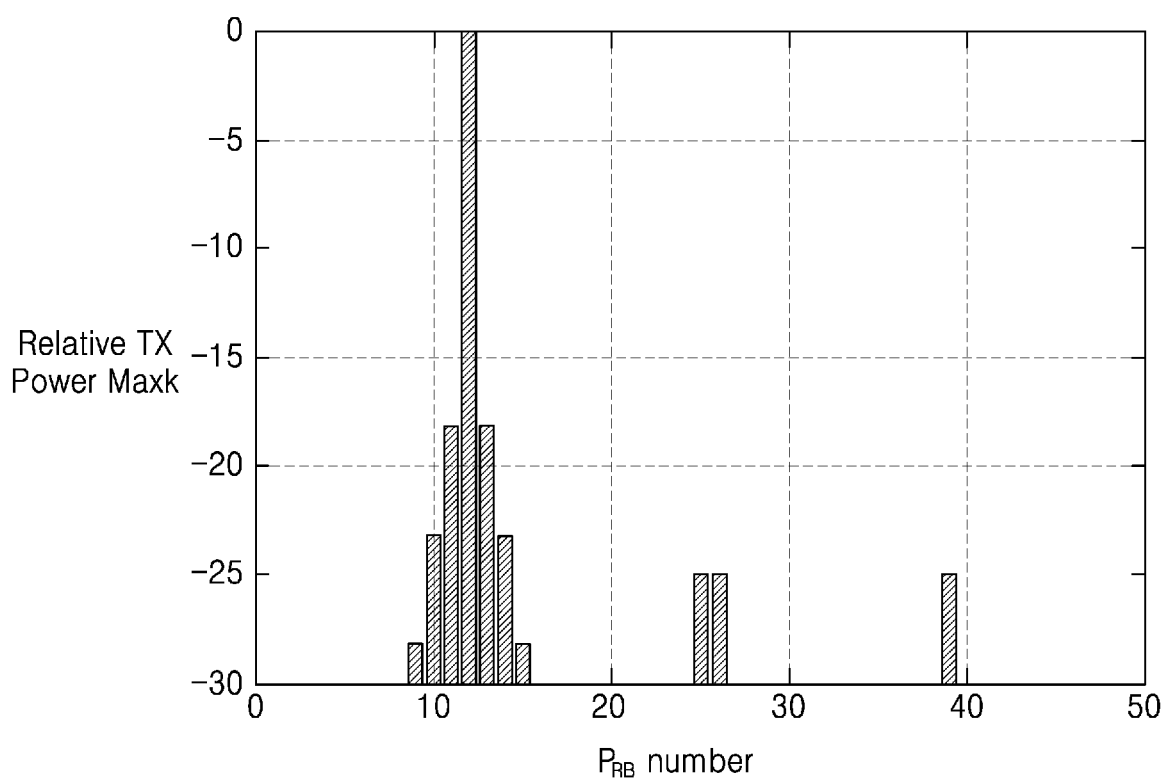
FIG. 11 illustrates interference caused to an adjacent frequency block by a frequency block transmitted by a sidelink terminal according to an embodiment of the disclosure.
Figure 12:
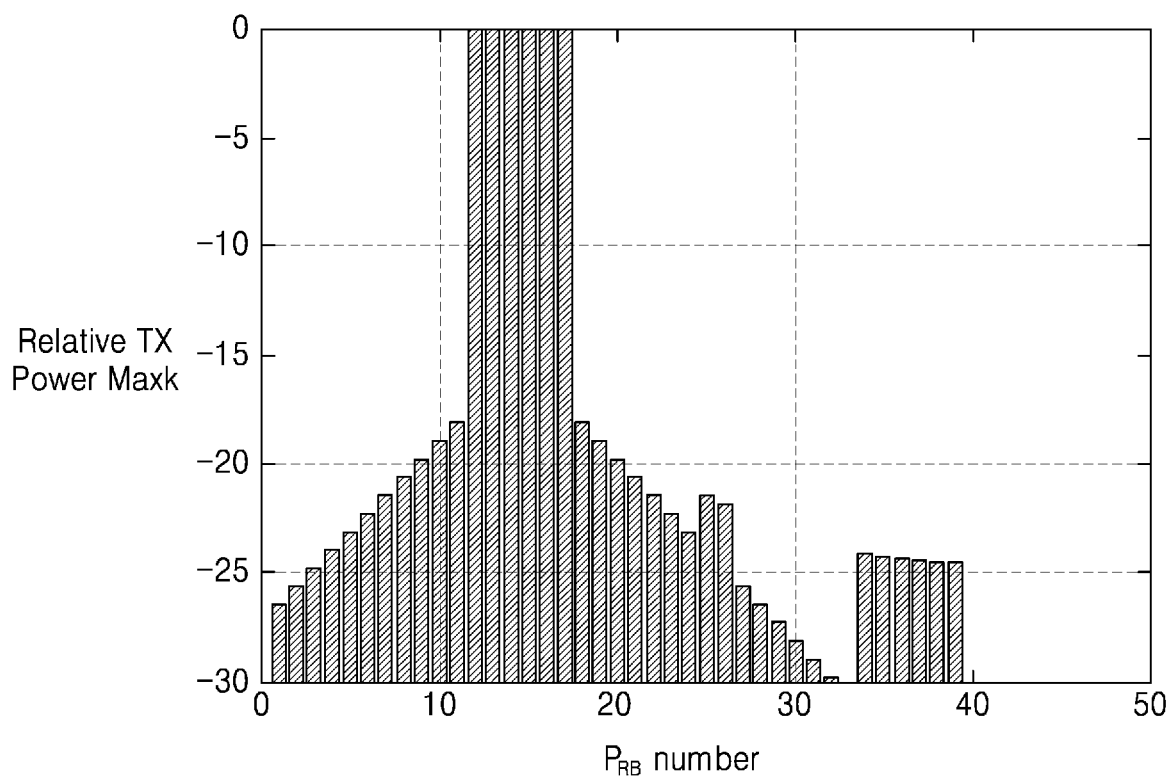
FIG. 12 illustrates interference caused to an adjacent frequency block by a frequency block transmitted by a sidelink terminal according to an embodiment of the disclosure.

When a signal used for pathloss estimation is an SL signal: An SL transmission terminal UE1 may transmit an SL reference signal to an SL reception terminal UE2. The SL reception terminal UE2 may receive the SL reference signal, measure an RSRP value, and report the measured RSRP value to the SL transmission terminal UE1. In this case, the RSRP value may be transmitted through a PSFCH or a PSSCH. When the RSRP value is transmitted through the PSSCH, the RSRP value may be transmitted through a MAC layer or an RRC layer. The SL transmission terminal UE1 may estimate an SL pathloss value by using Equation 2 based on the transmission power of the reference signal transmitted thereby to the SL reception terminal UE2 and the RSRP value reported from the SL reception terminal UE2. In another example, the SL transmission terminal UE1 may transmit information about the transmission power of the reference signal transmitted thereby to the SL reception terminal UE2. The SL reception terminal UE2 having received the information may measure the RSRP value from the reference value transmitted by the SL transmission terminal UE1 and estimate the pathloss value through Equation 2. The SL reception terminal UE2 may transmit the SL pathloss value to the SL transmission terminal UE1 through the PSFCH or the PSSCH. When the SL pathloss estimation value is transmitted through the PSSCH, a medium access control (MAC) control element (CE) may be used. However, as shown in FIG. 11, when a distance between the SL transmission terminal UE1 and the SL reception terminal UE2 is greater than a distance between the SL transmission terminal UE1 and the base station gNB, the SL signal transmitted by the SL transmission terminal UE1 may interfere with a gNB received signal. For example, FIGS. 11 and 12 show a level in which the SL signal causes interference with the gNB received signal. Referring to FIG. 11, it may be assumed that SL control information or data information may be transmitted in an RB index 12 (one RB is used). In addition, referring to FIG. 12, it may be assumed that the SL control information or data information may be transmitted using five RBs from RB index 12 to RB index 17. In FIG. 11, as SL transmission is performed in the RB index 12, a transmission power needs to be generated in the corresponding RB index 12, but due to interference (in-band emission), transmission powers may also be generated in nearby RB indexes (e.g., 9, 10, 11, 13, 14, and 15). The amount of interference may increase as the number of RBs allocated for SL transmission increases as shown in FIG. 12. Thus, an SL transmission terminal located close to the base station gNB may need to use a low transmission power so as not to interfere with an UL received signal of the base station gNB.

When a signal used for pathloss estimation is a DL signal of the base station gNB: to reduce the aforementioned interference with the received signal of the base station gNB, the SL transmission terminal UE1 may use a DL pathloss value with the base station gNB in Equation 1. More specifically, the DL pathloss value may be estimated by the SL transmission terminal UE1 through a CSI-RS transmitted by the base station gNB. In another example, the SL transmission terminal UE1 may estimate the DL pathloss value by using a secondary synchronization signal (SSS) transmitted by the base station gNB or estimate the DL pathloss value by using both the SSS and a DMRS transmitted through a physical broadcast channel (PBCH). The SL transmission terminal UE1 may basically estimate a DL pathloss value by using the SSS and determine based on implementation of the SL transmission terminal UE1 whether to further use the DMRS transmitted through the PBCH. In another example, the SL transmission terminal UE1 may estimate the DL pathloss value by using a CSI-RS for obtaining channel information transmitted by the base station gNB. Whether the SL transmission terminal UE1 has to estimate the DL pathloss value through any one of the signals SSS and CSI-RS may depend on a connection state between the SL transmission terminal UE1 and the base station gNB. For example, when the SL transmission terminal UE1 is in an RRC-connected state with the base station gNB, the SL transmission terminal UE1 may be configured by the base station gNB whether to estimate the DL pathloss value through any one of the signals. When the SL transmission terminal UE1 is in an RRC idle state with the base station gNB, the SL transmission terminal UE1 may estimate the DL pathloss value by using the SSS or both the SSS and the DMRS transmitted through the PBCH. As described above, the SL transmission terminal UE1 may basically estimate the DL pathloss value by using the SSS and determine based on implementation of the SL transmission terminal UE1 whether to further use the DMRS transmitted through the PBCH. Meanwhile, the base station gNB may transmit information about a transmission power of a reference signal to the SL transmission terminal UE1 through system information or RRC setup, and the SL transmission terminal UE1 may measure the RSRP value by using the reference signal transmitted by the base station gNB. The SL transmission terminal UE1 may estimate the DL pathloss value by using Equation 2 based on the transmission power of the reference signal transmitted from the base station gNB and the RSRP value measured thereby. By using the DL pathloss value, interference with the received signal of the base station gNB shown in FIGS. 11 and 12 may be addressed.

The base station gNB may configure a reference signal to be used by the terminal for PL (pathloss) estimation (i.e., whether the SSS or the CSI-RS for DL pathloss estimation is to be used or the SL reference signal for SL pathloss estimation is to be used).

Δ: this may mean a transmit power control (TPC) command for closed-loop power control or other RRC parameters. For example, this may mean an offset value of a transmission power according to a format of an SL feedback channel. In another example, this may mean a compensation value of a transmission power according to a spectral efficiency of an SL feedback channel. For example, as the spectral efficiency increases (i.e., when a less resource is used for transmission of the same bit or more bits are transmitted in the same resource), a higher transmission power needs to be used, such that it may be a parameter for compensating for a transmission power based on a spectral efficiency. Although Δ includes one parameter in Equation 1, Δ may also include a combination of two or more parameters.

FIG. 11 illustrates interference caused to an adjacent frequency block by a frequency block transmitted by a sidelink terminal according to an embodiment of the disclosure.

FIG. 12 illustrates interference caused to an adjacent frequency block by a frequency block transmitted by a sidelink terminal according to an embodiment of the disclosure.

Figure 13:
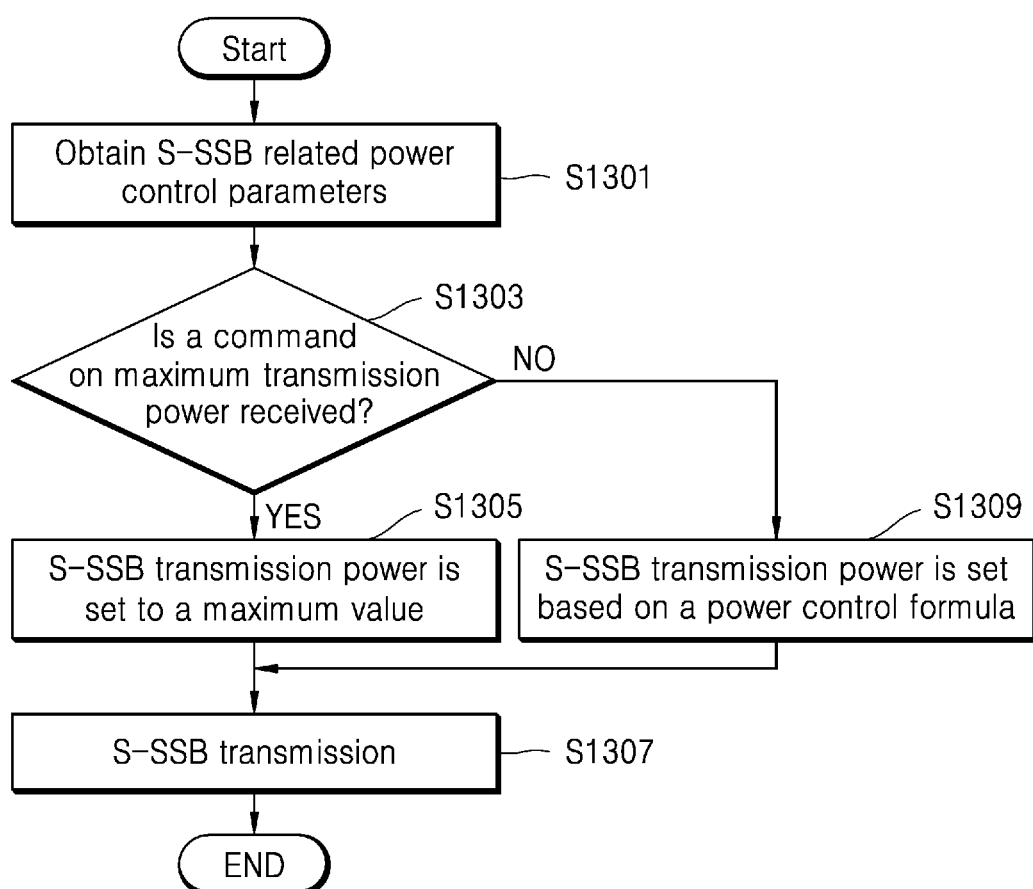
FIG. 13 illustrates a method of controlling a transmission power of a sidelink synchronization channel according to an embodiment of the disclosure.

FIG. 13 illustrates a method of controlling a transmission power of an SL synchronization channel according to an embodiment of the disclosure.

Referring to FIGS. 11-13, according to an embodiment of the disclosure, whether to transmit an SL synchronization channel may depend on a capability of an SL terminal. For example, an SL terminal having a transmission capability of an SL synchronization channel may transmit the SL synchronization channel based on a command of the base station. In this case, the SL terminal may be in the RRC connected state with the base station, and the base station may command the SL terminal to transmit the SL synchronization channel through RRC or DCI.

In another example, the SL terminal having the transmission capability of the SL synchronization channel may autonomously determine whether to transmit the SL synchronization channel. In this case, the SL terminal may be in the RRC idle state even when the SL terminal exists under the coverage of the base station. In this case, the base station may configure a threshold value for a DL RSRP through the SIB. The SL terminal having received the system information from the base station may compare a DL RSRP value (R_measure) with the base station, measured thereby, with a threshold value (R_threshold) for the DL RSRP value and transmit an SL synchronization channel More specifically, for R_measure<R_threshold or R_measure≤R_threshold, the SL terminal may transmit the SL synchronization channel.

Together with the command for transmission of the SL synchronization channel, the base station may transmit a transmission power parameter for SL synchronization channel transmission to the SL terminal through system information and/or RRC setup. In this case, the transmission power parameter for SL synchronization channel transmission may mean at least one of $P_0$, $\alpha$, $\mu$, M, or $\Delta$ stated in Equation 1.

In addition, the transmission power parameter for SL synchronization channel transmission may include information about whether the terminal needs to configure a transmission power by estimating DL pathloss, whether the terminal needs to configure a transmission power by estimating SL pathloss, or whether the terminal needs to configure a transmission power by estimating both DL pathloss and SL pathloss. Such information may be transmitted by the base station to the terminal through system information or RRC and may mean at least one of the following information:

1) Transmit Link Information to be Used by the Terminal for Pathloss Estimation Through Indication or Configuration of a Reference Signal Type For example, the base station may transmit information about a link to be used by the terminal to estimate PL (pathloss) based on indication of a reference signal to be used among a DL SSB, a DL CSI-RS, or a DMRS of an SL data channel. For example, through agreement between the base station and the terminal, an indicator index of 0 may mean the DL SSB, an indicator index of 1 may mean the DL CSI-RS, and an indicator index of 2 may mean the DMRS of the SL data channel. An indicator index of 3 may mean use of both the DL SSB and the DMRS of the SL data channel. An indicator index of 4 may mean use of both the DL CSI-RS and the DMRS of the SL data channel. In another example, the system information or the RRC configuration information may explicitly include a type of the reference signal to be used by the terminal for pathloss estimation.

2) Transmit Link Information to be Used by the Terminal for Pathloss Estimation Through a Transmission Power Parameter, Such as $P_0$, $\alpha$, and the Like.

For example, the base station may differently configure a transmission power parameter available for application of DL pathloss and a transmission power parameter available for application of SL pathloss. In operations S1303 and S1305, the terminal having received the transmission power parameter in operation S1301 may determine whether to apply the DL pathloss or the SL pathloss. More specifically, the base station may configure the parameters $P_0$ and $\alpha$ of Equation 1 through different parameters differently according to application of the DL pathloss and application of the SL pathloss. For example, when DL pathloss has to be applied, the base station may configure $P_{0\_DL}$ and $\alpha_{DL}$, and when the SL pathloss has to be applied, the base station may configure $P_{0\_SL}$ and $\alpha_{SL}$. When both the DL pathloss and the SL pathloss have to be applied, the base station may configure $P_{0\_DL}$, $\alpha_{DL}$, $P_{0\_SL}$, and $\alpha_{SL}$.

Through at least one of the foregoing methods, a terminal transmitting an SL synchronization channel may determine whether to configure a transmission power based on DL pathloss with the base station, whether to configure a transmission power based on SL pathloss with another SL terminal, or whether to configure a transmission power based on both DL pathloss and SL pathloss.

The transmission power parameter for SL synchronization channel transmission, as well as the foregoing parameter, may include a parameter for estimating pathloss (PL) of Equation 1, which may mean a transmission power of a reference signal used for pathloss estimation mentioned in Equation 2.

More specifically, the base station may configure the terminal to use a DL SSB or a DL CSI-RS through system information or RRC. The terminal for transmitting an SL synchronization channel, which has received the information, may use a DL SSB or a DL CSI-RS transmitted by the base station for pathloss (PL) estimation of Equation 1 and Equation 2. When the base station configures the terminal to use the DL SSB, the base station may transmit information about an SSB transmission power to the terminal through system information or RRC signaling. Likewise, when the base station configures the terminal to use the DL CSI-RS, the base station may transmit information about a CSI-RS transmission power to the terminal through signaling of at least one of system information, RRC, or DCI. A method of signaling the information about the CSI-RS transmission power may be performed through two operations. For example, the base station may transmit the information about the SSB transmission power to the terminal through system information or RRC signaling, and transmit an offset (difference) for the SSB transmission power and the CSI-RS transmission power to the terminal through signaling of at least one of system information, RRC, or DCI.

At least one of the above-described transmission power parameters may be included in SL resource pool configuration information. For example, an SL resource pool 1 may be configured with $P_{0,1}$, $\alpha_1$, $\mu_1$, $M_1$, and $\Delta_1$, and an SL resource pool 2 may be configured with $P_{0,2}$, $\alpha_2$, $\mu_2$, $M_2$, and $\Delta_2$. In this case, each transmission power parameter that may be set for an SL resource pool may be different or identical for SL resource pools. For example, $P_{0,1}$ configured for the SL resource pool 1 and $P_{0,2}$ configured for the SL resource pool 2 may have values that are equal to or different from each other. Likewise, $\alpha_1$ configured for the SL resource pool 1 and $\alpha_2$ configured for the SL resource pool 2 may have values that are equal to or different from each other.

Meanwhile, referring to FIG. 13, the terminal having received the transmission power parameter may receive a command of whether to transmit an SL synchronization channel from the base station with a maximum transmission power in operation S1303. In operations S1305 and S1307, the terminal having received the command may transmit the SL synchronization channel with the maximum transmission power, as in Equation 3.

$$P_{S\text{-}PSS} = P_{CMAX,PSBCH}$$

$$P_{S\text{-}SSS} = P_{CMAX,S\text{-}SSS} \qquad \text{Equation 3}$$

In Equation 3, $P_{S\text{-}PSS}$ may mean a transmission power of S-PSS and $P_{S\text{-}SSS}$ may mean a transmission power of S-SSS. When the base station commands the terminal to transmit the SL synchronization channel with the maximum transmission power, the terminal may transmit the SL synchronization channel by configuring the transmission power of the S-PSS identically to the maximum transmission power of the PSBCH. The transmission power of the S-SSS may be set equal to the maximum transmission power of the S-SSS for transmission. The S-PSS and the PSBCH are applied with the same power back-off or the same maximum power reduction (MPR), such that the maximum transmission power of the S-PSS and the maximum transmission power of the PSBCH may be equal to each other. However, as the S-SSS is applied with more power back-off or more MPR than the S-PSS/PSBCH, a separate maximum transmission power may exist in the S-SSS, unlike in the S-PSS/PSBCH. As such, the power back-off of the S-SSS and the power back-off of the S-PSS/PSBCH are different because peak-to-average power ratio (PAPR) characteristics of a sequence (gold sequence) used in the S-SSS are much more degraded than a Zadoff-Chu sequence used in the S-PSS. For example, when the PAPR characteristics of the sequences used in the S-PSS and the S-SSS are similar, the S-PSS, the S-SSS, and the PSBCH all may apply the same power back-off or the same MPR. In this case, Equation 3 may be substituted by Equation 4.

$$P_{S\text{-}PSS} = P_{S\text{-}SSS} = P_{CMAX,PSBCH} = P_{CMAX} \qquad \text{Equation 4}$$

In Equation 4, $P_{CMAX}$ may have the same meaning as $P_{CMAX}$ of Equation 1.

Meanwhile, when the base station does not instruct or configure transmission of the maximum transmission power of the SL synchronization channel, the terminal may determine the transmission powers of the S-PSS, the S-SSS, and the PSBCH by using Equation 5 and Equation 6.

Equation 5

$$P_{S\text{-}PSS} = P_{PSBCH} = \min\{P_{CMAX,PSBCH}, 10\log_{10}(2^\mu \cdot M) + P_0 + \alpha \cdot PL\} \text{ [dBm]}$$

$$P_{S\text{-}SSS} = \min\{P_{CMAX,S\text{-}SSS}, 10\log_{10}(2^\mu \cdot M) + P_0 + \alpha \cdot PL\} \text{ [dBm]} \qquad \text{Equation 5}$$

When a DL pathloss value is applied to Equation 5, Equation 5 may be as below.

$$P_{S\text{-}PSS} = P_{PSBCH} = \min\{P_{CMAX,PSBCH}, 10\log_{10}(2^\mu \cdot M) + P_{0\_DL} + \alpha_{DL} \cdot PL_{DL}\} \text{ [dBm]}$$

$$P_{S\text{-}SSS} = \min\{P_{CMAX,S\text{-}SSS}, 10\log_{10}(2^\mu \cdot M) + P_{0\_DL} + \alpha_{DL} \cdot PL_{DL}\} \text{ [dBm]}$$

When an SL pathloss value is applied to Equation 5, Equation 5 may be as below.

$$P_{S\text{-}PSS} = P_{PSBCH} = \min\{P_{CMAX,PSBCH}, 10\log_{10}(2^\mu \cdot M) + P_{0\_SL} + \alpha_{SL} \cdot PL_{SL}\} \text{ [dBm]}$$

$$P_{S\text{-}SSS} = \min\{P_{CMAX,S\text{-}SSS}, 10\log_{10}(2^\mu \cdot M) + P_{0\_SL} + \alpha_{SL} \cdot PL_{SL}\} \text{ [dBm]}$$

When both the DL pathloss value and the SL pathloss value are applied to Equation 5, Equation 5 may be as below.

$$P_{S\text{-}PSS} = P_{PSBCH} = \min\{P_{CMAX,PSBCH}, \min(A,B)\} \text{ [dBm]}$$

$$P_{S\text{-}SSS} = \min\{P_{CMAX,S\text{-}SSS}, \min(A,B)\} \text{ [dBm]}$$

In Equations, $A = 10\log_{10}(2^\mu \cdot M) + P_{0\_DL} + \alpha_{DL} \cdot PL_{DL}$ and $B = 10\log_{10}(2^\mu \cdot M) + P_{0\_SL} + \alpha_{SL} \cdot PL_{SL}$.

$$P_{S\text{-}PSS} = P_{S\text{-}SSS} = P_{PSBCH} = \min\{P_{CMAX}, 10\log_{10}(2^\mu \cdot M) + P_0 + \alpha \cdot PL\} \text{ [dBm]} \qquad \text{Equation 6}$$

When a DL pathloss value is applied to Equation 6, Equation 6 may be as below.

$$P_{S\text{-}PSS} = P_{S\text{-}SSS} = P_{PSBCH} = \min\{P_{CMAX}, 10\log_{10}(2^\mu \cdot M) + P_{0\_DL} + \alpha_{DL} \cdot PL_{DL}\} \text{ [dBm]}$$

When an SL pathloss value is applied to Equation 6, Equation 6 may be as below.

$$P_{S\text{-}PSS} = P_{S\text{-}SSS} = P_{PSBCH} = \min\{P_{CMAX}, 10\log_{10}(2^\mu \cdot M) + P_{0\_SL} + \alpha_{SL} \cdot PL_{SL}\} \text{ [dBm]}$$

When both the DL pathloss value and the SL pathloss value are applied to Equation 6, Equation 6 may be as below.

$$P_{S\text{-}PSS} = P_{S\text{-}SSS} = P_{PSBCH} = \min\{P_{CMAX}, \min(A,B)\} \text{ [dBm]}$$

In this case, $A = 10\log_{10}(2^\mu \cdot M) + P_{0\_DL} + \alpha_{DL} \cdot PL_{DL}$ and $B = 10\log_{10}(2^\mu \cdot M) + P_{0\_SL} + \alpha_{SL} \cdot PL_{SL}$.

Equation 5 may be applied when the S-PSS/PSBCH and the S-SSS use different power back-off or different MPRs. Meanwhile, Equation 6 may be applied when the S-PSS/PSBCH and the S-SSS use the same power back-off or the same MPR, in which $P_{CMAX}$ of Equation 6 may be substituted by $P_{CMAX,PSBCH}$ or $P_{CMAX,S\text{-}SSS}$ of Equation 5.

In Equation 3, Equation 4, Equation 5, Equation 6, and modified equations thereof, $P_{0\_DL}$, $\alpha_{DL}$, $P_{0\_SL}$, and $\alpha_{SL}$ may be the same as or different from $P_{0\_DL}$, $\alpha_{DL}$, $P_{0\_SL}$, and $\alpha_{SL}$ used for transmission power control of an SL control channel and a data channel. In Equation 3, Equation 4, Equation 5, Equation 6, and modified equations thereof, $P_{0\_DL}$, $\alpha_{DL}$, $P_{0\_SL}$, $\alpha_{SL}$ may be the same as or different from $P_{0\_DL}$, $\alpha_{DL}$, $P_{0\_SL}$, $\alpha_{SL}$ used for transmission power control of an SL feedback channel.

The terminal that determines a transmission power of the S-PSS, the S-SSS, and the PSBCH according to at least one of Equation 3, Equation 4, Equation 5, Equation 6, or modified equations thereof may transmit the S-SSB based on the corresponding transmission power in operation S1309.

Meanwhile, unlike as shown in FIG. 13, an operation, performed by the base station, of commanding the terminal to transmit the SL synchronization channel with the maximum transmission power may be omitted. In this case, in FIG. 13, an operation of determining whether the terminal transmits the SL synchronization channel with the maximum transmission power may be omitted.

Figure 14:
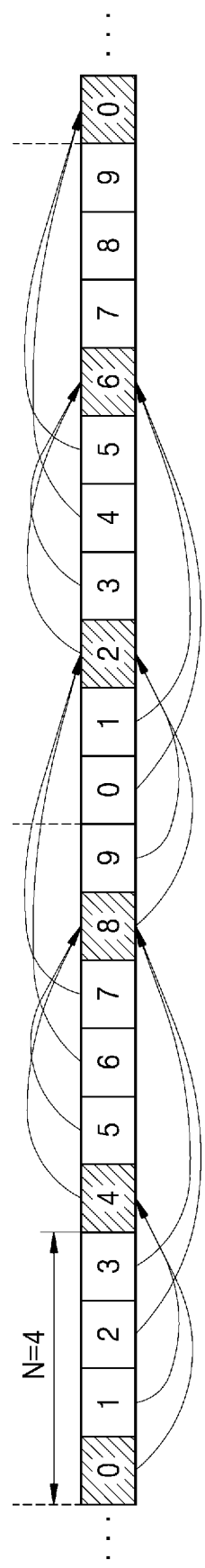
FIG. 14 illustrates an operation of time-axis resource allocation of a sidelink feedback channel according to an embodiment of the disclosure.

FIG. 14 illustrates an operation of time-axis resource allocation of an SL feedback channel according to an embodiment of the disclosure.

Referring to FIG. 14, a time-axis resource of the PSFCH (SL feedback channel) may have a period of four slots (N=4) starting from slot 0. Thus, the time-axis resource of the PSFCH (SL feedback channel) may exist in slot 0, slot 4, slot 8, slot 2, and slot 6. Referring to FIG. 14, a time relationship between the PSSCH transmitted by the SL transmission terminal (i.e., the PSSCH received by the SL reception terminal) and the PSFCH that has to be transmitted by the SL reception terminal, i.e., K, is assumed to be 3 slots. For example, within a time shorter than 3 slots, the SL reception terminal may not be able to decode the PSSCH transmitted from the SL transmission terminal, prepare for HARQ-ACK information and HARQ-NACK information, and transmit the PSFCH. Thus, as shown in FIG. 12, the HARQ-ACK/NACK information corresponding to the PSSCH received by the SL reception terminal in slot 0 and slot 1 may be transmitted in slot 4. The HARQ-ACK/NACK information corresponding to the PSSCH received by the SL reception terminal in slot 2, slot 3, slot 4, and slot 5 may be transmitted in slot 8. In addition, the HARQ-ACK/NACK information corresponding to the PSSCH received by the SL reception terminal in slot 6, slot 7, slot 8, and slot 9 may be transmitted in slot 2.

Referring to FIG. 14, the SL feedback channel (PSFCH) transmitting the HARQ-ACK/NACK information for the SL data channel (PSSCH) may exist in some slots with a certain period, rather than in every slot. For example, FIG. 14 shows an example where the PSFCH has a period of four slots. One SL reception terminal may receive different PSSCHs from a plurality of SL transmission terminals. In this case, the SL reception terminal may have to transmit a plurality of SL feedback channels. Moreover, one SL reception terminal may receive different PSSCHs from the same SL transmission terminal. In this case, the SL reception terminal may have to transmit a plurality of SL feedback channels. To this end, it is necessary to consider a method of determining a transmission power for a plurality of PSFCH transmissions.

Figure 15:
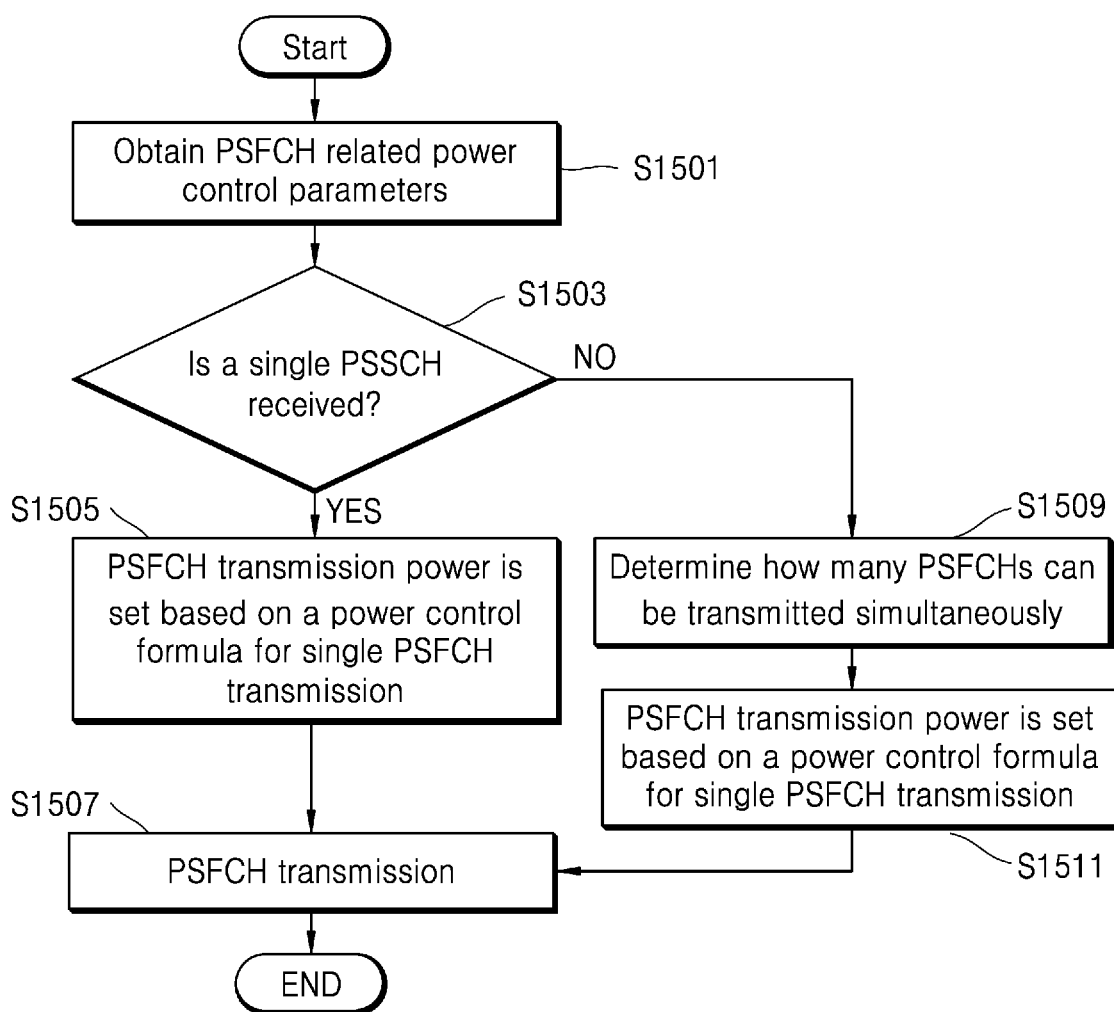
FIG. 15 illustrates an operation of a method of determining a transmission power when one sidelink reception terminal transmits a plurality of sidelink feedback channels according to an embodiment of the disclosure.

FIG. 15 illustrates an operation of a method of determining a transmission power when one SL reception terminal transmits a plurality of SL feedback channels according to an embodiment of the disclosure.

When one SL reception terminal transmits one SL feedback channel, a transmission power of a PSFCH may be determined by Equation 7.

$$P_{PSFCH} = \min\{P_{CMAX}, 10 \log_{10}(2^{\mu} \cdot M) + P_{0\_PSFCH} + \alpha_{PSFCH} \cdot PL\} \text{ [dBm]} \quad \text{Equation 7}$$

In Equation 7, when a size of a frequency block used for one PSFCH transmission is 1, M may be omitted (i.e., M=1). In Equation 7, a pathloss (PL) value may mean a DL pathloss value. In this case, as described with reference to FIGS. 10 through 13, the SL reception terminal transmitting the PSFCH may estimate the DL pathloss value through the SSB, the SSB and the DMRS of the PBCH, or the CSI-RS transmitted from the base station. In this case, $P_{0\_PSFCH}$ may mean $P_{0\_DL\_PSFCH}$, and $\alpha_{PSFCH}$ may mean $\alpha_{DL\_PSFCH}$.

Meanwhile, when the SL reception terminal transmitting the PSFCH is located outside the coverage of the base station, pre-configuration may be made as $\alpha_{PSFCH}=0$ in Equation 7. For example, when the SL reception terminal is located outside the coverage of the base station, the transmission power of the PSFCH may be determined by $\min\{P_{CMAX}, 10 \log_{10}(2^{\mu} \cdot M) + P_{0\_PSFCH}\}$. In another example, when the SL reception terminal is located outside the coverage of the base station, the transmission power of the PSFCH may be fixed to a pre-configured value rather than determined by an equation (e.g., Equation 7).

In an embodiment of the disclosure, Equation 7 may mean an equation regarding a method of determining a PSFCH transmission power when one SL reception terminal transmits one PSFCH. As described with reference to FIG. 14, one SL reception terminal may transmit a plurality of PSFCHs, such that a method of determining PSFCH transmission power in this case needs to be considered.

The number of PSFCHs that may be transmitted simultaneously by one terminal may be assumed to be N (N means a period of a PSFCH time resource in FIG. 13, but in FIG. 15, N may mean the number of PSFCHs that may be transmitted simultaneously by one terminal). In this case, N may have different values according to a capability of an SL terminal. For example, the SL terminal-1 may have N=4, the SL terminal-2 may have N=2, and the SL terminal-3 may have N=1. The capability of the SL terminal may be reported to the base station when the SL terminal exists under the coverage of the base station (in-coverage). The base station may reflect the capability of the terminal in resource allocation of the SL feedback channel (i.e., in setting of the period of the PSFCH time resource). Meanwhile, the SL transmission terminal and the SL reception terminal may exchange information about the capability when performing PC-5 RRC connection setup.

The above-described N value may mean the maximum number of PSFCHs simultaneously transmitted by the SL terminal, and in actual PSFCH transmission, the terminal may transmit the PSFCH by using a value less than N. For example, for N=4, the SL terminal may simultaneously transmit two PSFCHs being less than four PSFCHs.

Referring to FIG. 15, in operation S1501, the SL reception terminal that is to transmit the PSFCH may receive a parameter for configuring a PSFCH transmission power from the base station through system information and/or RRC setup. In this case, the parameter for configuring the PSFCH transmission power may mean at least one of $P_0$, $\alpha$, $\mu$, M, $\Delta$, or information about a link to which a pathloss value is to be applied, described in FIGS. 10 through 13. The SL reception terminal having received the parameter may determine the number of PSSCHs necessary for PSFCH transmission. In this case, the PSFCH transmission resource may be determined based on the frequency resource of the PSSCH (e.g., a starting sub-channel index in which the PSSCH is received) and the time resource of the PSSCH (e.g., a slot index in which the PSSCH is received). In this way, when one PSSCH requiring PSFCH transmission is received, the SL reception terminal may determine the PSFCH transmission power through Equation 7.

If it is determined in operation S1503 that a single PSSCH is received, the process moves to operation S1505 where PSFCH transmission power is set based on a power control formula for single PSFCH transmission. On the other hand, if it is determined in operation S1503 that a plurality of PSSCHs requiring PSFCH transmission are received and simultaneous transmission of the PSFCH is required, the SL terminal may determine how many PSFCHs are to be transmitted simultaneously in operation S1509. In this case, N indicating the maximum number of PSFCHs that may be transmitted simultaneously may vary with a capability of the terminal as described above. Meanwhile, the number of PSFCHs the SL reception terminal has to simultaneously transmit may be configured for each resource pool. For example, assuming the number of PSFCHs the SL reception terminal has to simultaneously transmit to be L, a condition of L≤N may have to be satisfied. More specifically, when SL reception terminals having capabilities of N=4, N=3, and N=2 have to transmit PSFCHs, respectively, in one resource pool, L may be equal to 2 in the corresponding resource pool (L=2). For example, considering the capabilities of the SL reception terminals, based on the SL terminals having minimum capabilities, L may be set in a resource pool in which PSFCH transmission is possible.

As described above, when L is set in the resource pool (L≤N), the SL reception terminal may have to transmit a smaller number of PSFCHs than N at the time of PSFCH transmission. In another example, due to a shortage of PSFCH resources, the SL reception terminal may have to transmit a smaller number of PSFCHs than N at the time of PSFCH transmission. In this case, an operation of selecting L PSFCH transmission candidates from among N PSFCH transmission candidates may be added. For example, as mentioned above, a PSSCH resource may have a mapping relationship with a PSFCH resource. As each SL data transmitted through a PSSCH may have a priority received from a higher layer, the SL reception terminal may select L PSFCHs to be actually transmitted from the N PSFCH transmission candidates based on the priority (in this case, L may be greater than or equal to 1).

In operation S1511, as described above, the SL reception terminal having selected the number of PSFCHs that have to be transmitted simultaneously based on the priority and/or the number of PSFCH resources at the time of transmission may configure the transmission power of the PSFCH by using at least one of the following methods.

Method 1) Determine PSFCH transmission power based on the number L of PSFCHs to be transmitted simultaneously Method 1) may mean determining the transmission power for L PSFCHs based on Equation 8.

$$P_{PSFCH}=\min\{P_{CMAX,L}, 10 \log_{10}(2^{\mu} \cdot M \cdot L)+P_{0\_PSFCH}+\alpha_{PSFCH} \cdot PL\} \text{ [dBm]} \quad \text{Equation 8}$$

In Equation 8, $P_{CMAX,L}$ may indicate a maximum transmission power allowed to the terminal when L PSFCHs are transmitted simultaneously. In general, as $P_{CMAX}$ may refer to a maximum transmission power of the terminal, which is configured regardless of the number of PSFCHs to be transmitted, it may not be desirable that the maximum transmission power of the terminal changes with the number of PSFCHs transmitted simultaneously. Thus, Equation 8 may not be appropriate. In another example, Equation 9 may be considered.

$$P_{PSFCH}=\min\{P_{CMAX}, 10 \log_{10}(2^{\mu} \cdot M \cdot L)+P_{0\_PSFCH}+\alpha_{PSFCH} \cdot PL\} \text{ [dBm]} \quad \text{Equation 9}$$

In Equation 9, the SL reception terminal that is to transmit the L PSFCHs simultaneously may calculate the transmission power for the L PSFCHs based on $Z\_dB=10 \log_{10}(2^{\mu} \cdot M \cdot L)+P_{0\_PSFCH}+\alpha_{PSFCH} \cdot PL$. In case of $Z\_dB<P_{CMAX}$, $Z\_dB$ may be used as the transmission power for the L PSFCHs. On the other hand, for $Z\_dB \geq P_{CMAX}$, the terminal may equally scale down the transmission power for the L PSFCHs such that $Z\_dB$ is less than or equal to $P_{CMAX}$.

More specifically, the transmission power for one PSFCH that is configured for transmission of the PSFCH may be defined as $X\_dB=10 \log_{10}(2^{\mu} \cdot M)+P_{0\_PSFCH}+\alpha_{PSFCH} \cdot PL$, in which $X=10^{\wedge}(X\_dB/10)$. For example, $X\_dB$ in a dB scale is converted into X of a linear domain. In this case, a definition of $Y=L \cdot X$ may be made, in which X (linear domain expression of the transmission power for the PSFCH configured in transmission of one PSFCH) is multiplied by L (i.e., L PSFCHs are transmitted). Y of the linear domain may be changed into a dB value as below. $Y\_dB=10 \log_{10}(Y)=10 \log_{10}(L \cdot X)=10 \log_{10}(L)+10 \log_{10}(X)=10 \log_{10}(L)+X\_dB$. In this case, as $X\_dB$ is defined above as $10 \log_{10}(2^{\mu} \cdot M)+P_{0\_PSFCH}+\alpha_{PSFCH} \cdot PL$, $Y\_dB$ may be represented as $10 \log_{10}(L)+10 \log_{10}(2^{\mu} \cdot M)+P_{0\_PSFCH}+\alpha_{PSFCH} \cdot PL$, which may be the same as the above-defined $Z\_dB$.

Meanwhile, the above-described scaling-down operation may be performed in the linear domain rather than in the dB domain. For example, $Z\_dB$ may be converted into the linear domain $(Z=10^{\wedge}(X\_dB/10))$, and $P_{CMAX}$ may be converted into the linear domain $(10^{\wedge}(P_{CMAX}/10))$. In this case, to satisfy $10^{\wedge}(P_{CMAX}/10) \leq \beta \cdot Z$, scaling by $\beta$ may be performed, in which $\beta$ may have a value of $0 \leq \beta \leq 1$.

Method 2) Determine the transmission power for one PSFCH and scale the same based on the number of PSFCHs to be transmitted simultaneously.

Method 2) may be similar with Method 1), but may have the following difference: For transmission of N PSFCH transmissions, Equation 10 may be considered.

$$P_{PSFCH-1}=\min\{P_{CMAX}, 10 \log_{10}(2^{\mu\_1} \cdot M_1)+P_{0\_PSFCH-1}+\alpha_{PSFCH-1} \cdot PL_1\} \text{ [dBm]}$$

$$P_{PSFCH-2}=\min\{P_{CMAX}, 10 \log_{10}(2^{\mu\_2} \cdot M_2)+P_{0\_PSFCH-2}+\alpha_{PSFCH-2} \cdot PL_2\} \text{ [dBm]}$$

$$P_{PSFCH-N}=\min\{P_{CMAX}, 10 \log_{10}(2^{\mu\_N} \cdot M_N)+P_{0\_PSFCH-N}+\alpha_{PSFCH-N} \cdot PL_N\} \text{ [dBm]} \quad \text{Equation 10}$$

In Equation 10, $P_{PSFCH-N}$ may mean the transmission power of an $N^{th}$ PSFCH, and $\mu\_N$, $M_N$, $P_{0\_PSFCH-N}$, $\alpha_{PSFCH-N}$, and $PL_N$ may mean a subcarrier spacing of the $N^{th}$ PSFCH, a size of an allocated frequency block, $P_0$, $\alpha$, and a pathloss value, respectively. When N PSFCHs are transmitted to different SL transmission terminals, at least one of the above-described parameters may be different. For example, the first PSFCH and the second PSFCH may be transmitted to the SL transmission terminal-1, and the third PSFCH may be transmitted to the SL transmission terminal-2. In this case, the transmission power of each PSFCH may be different. When a plurality of PSFCHs are transmitted to the same transmission terminal, at least one of the above-described parameters may have a different value based on a configuration of the base station, and the like.

When the SL reception terminal has to transmit the L PSFCHs among the N PSFCHs to the same transmission terminal or different transmission terminals simultaneously, the transmission power for each PSFCH needs to be configured identical. This is because when the transmission power for each PSFCH transmitted in the same symbol is different, interference may be caused between PSFCHs to be transmitted, due to imbalance of the transmission power of each PSFCH. To this end, at least one of the following operations may be considered.

Method 2-A) The transmission power for each of the L PSFCHs may be calculated based on Equation 10, and the transmission power may be scaled down or up such that the transmission power for each of the other PSFCHs than the PSFCH having the highest priority is equal to each other based on that of the PSFCH having the highest priority. In this case, an operation for scaling down or up may be performed in the linear domain as mentioned above.

Method 2-B) The transmission power for each of the L PSFCHs is calculated based on Equation 10, and unlike in Method 2-A), regardless of the priority, the transmission power may be scaled up such that the transmission power for each of the other PSFCHs than the PSFCH having the highest transmission power is equal to each other based on that of the PSFCH having the highest transmission power. Alternatively, the transmission power may be scaled down such that the transmission power for each of the other PSFCHs than the PSFCH having the lowest transmission power is equal to each other based on that of the PSFCH having the lowest transmission power. In this case, the operation for scaling down or up may be performed in the linear domain as mentioned above.

Through Method 2-A) or Method 2-B), when the transmission power value for each of the L PSFCHs transmitted simultaneously is calculated and the transmission power for each of the L PSFCHs is maintained equal, the SL reception terminal may calculate the transmission power for the L PSFCHs based on Equation 9. As mentioned above, the transmission power for the L PSFCHs may be calculated based on $Z\_dB = 10 \log_{10}(2^{\mu} \cdot M \cdot L) + P_{0\_PSFCH} + \alpha_{PSFCH} \cdot PL$. In case of $Z\_dB < P_{CMAX}$, $Z\_dB$ may be used as the transmission power for the L PSFCHs. On the other hand, for $Z\_dB \geq P_{CMAX}$, the terminal may perform an additional scaling-down operation to equally maintain the transmission power for the L PSFCHs such that $Z\_dB$ is less than or equal to $P_{CMAX}$.

The disclosure relates to a method and apparatus for controlling a transmission power of an SL synchronization channel in a wireless communication system, in which the method according to an embodiment of the disclosure may include receiving a parameter for controlling a transmission power of an SL synchronization channel from a base station, determining the transmission power of the SL synchronization channel based on the parameter, and transmitting the SL synchronization channel based on configuration of the transmission power in operation S1507.

The disclosure relates to a method and apparatus for controlling a transmission power of an SL feedback channel in a wireless communication system, in which the method according to an embodiment of the disclosure may include receiving a parameter for controlling a transmission power of an SL feedback channel from a base station, determining the transmission power of the SL feedback channel based on the parameter, and transmitting the SL feedback channel based on configuration of the transmission power.

Figure 16:
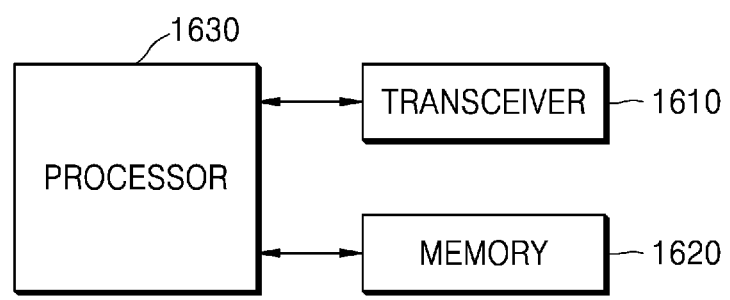
FIG. 16 is a block diagram of a structure of a transmission terminal according to an embodiment of the disclosure.

FIG. 16 is a block diagram of a structure of a transmission terminal according to an embodiment of the disclosure.

Referring to FIG. 16, a transmission terminal according to the disclosure may include a transceiver 1610, a memory 1620, and a processor 1630. According to the above-described communication method of the transmission terminal, the processor 1630, the transceiver 1610, and the memory 1620 of the transmission terminal may operate. However, components of the transmission terminal are not limited to the above-described example. For example, the transmission terminal may include components that are more than or fewer than the above-described components. Moreover, the processor 1630, the transceiver 1610, and the memory 1620 may be implemented in the form of a single chip. The processor 1630 may refer to one or more processors.

The transceiver 1610 may collectively refer to a receiver and a transmitter of the transmission terminal, and transmit and receive a signal to and from the base station. The signal transmitted and received to and from the base station may include control information and data. To this end, the transceiver 1610 may include an RF transmitter that up-converts and amplifies a frequency of a transmission signal and an RF receiver that low-noise-amplifies a received signal and down-converts a frequency. However, this is merely an example of the transceiver 1610, components of which are not limited to the RF transmitter and the RF receiver.

The transceiver 1610 may receive a signal through a radio channel and output the received signal to the processor 1630, and transmit a signal output from the processor 1630 through the radio channel.

The memory 1620 may store programs and data required for an operation of the transmission terminal. The memory 1620 may also store control information or data included in a signal obtained by the transmission terminal. The memory 1620 may include a storage medium, such as read only memory (ROM), random access memory (RAM), hard-disk, compact disc (CD)-ROM, digital versatile disc (DVD), and the like, or a combination thereof.

The processor 1630 may control a series of processes such that the transmission terminal operates according to the above-described embodiment of the disclosure. For example, the processor 1630 may control components of the transmission terminal to perform a method of configuring transmission powers of an SL synchronization channel and an SL feedback channel according to an embodiment of the disclosure. For example, the transceiver 1610 may receive a data signal including a control signal, and the processor 1230 may determine a reception result for the data signal.

Figure 17:
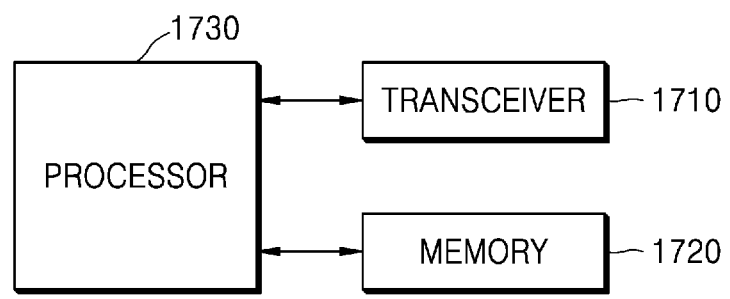
FIG. 17 is a block diagram of a structure of a reception terminal according to an embodiment of the disclosure.

FIG. 17 is a block diagram of a structure of a reception terminal according to an embodiment of the disclosure.

Referring to FIG. 17, the reception terminal according to the disclosure may include a transceiver 1710, a memory 1720, and a processor 1730. According to the above-described communication method of the base station, the processor 1730, the transceiver 1710, and the memory 1720 of the reception terminal may operate. However, components of the reception terminal are not limited to the above-described example. For example, the reception terminal may include components that are more than or fewer than the above-described components. Moreover, the processor 1730, the transceiver 1710, and the memory 1720 may be implemented in the form of a single chip. The processor 1730 may refer to one or more processors.

The transceiver 1710 may collectively refer to a receiver and a transmitter of the reception terminal, and transmit and receive a signal to and from the base station. The signal transmitted and received to and from the base station may include control information and data. To this end, the transceiver 1710 may include an RF transmitter that up-converts and amplifies a frequency of a transmission signal and an RF receiver that low-noise-amplifies a received signal and down-converts a frequency. However, this is merely an example of the transceiver 1710, components of which are not limited to the RF transmitter and the RF receiver.

The transceiver 1710 may receive a signal through a radio channel and output the received signal to the processor 1730, and transmit a signal output from the processor 1730 through the radio channel.

The memory 1720 may store programs and data required for an operation of the reception terminal. The memory 1720 may also store control information or data included in a signal obtained by the reception terminal. The memory 1720 may include a storage medium, such as ROM, RAM, hard-disk, CD-ROM, DVD, and the like, or a combination thereof.

The processor 1730 may control a series of processes such that the reception terminal operates according to the above-described embodiment of the disclosure. For example, the processor 1730 may control components of the reception terminal to perform the method of configuring transmission powers of an SL synchronization channel and an SL feedback channel according to an embodiment of the disclosure. For example, the transceiver 1710 may receive a data signal including a control signal, and the processor 1730 may determine a reception result for the data signal.

The methods according to the embodiments of the disclosure described in the claims or specification of the disclosure may be implemented by hardware, software, or a combination thereof.

When the methods are implemented as software, a computer-readable storage medium or a computer program product having stored therein one or more programs (software modules) may be provided. The one or more programs stored in the computer-readable storage medium or computer program product may be configured for execution by one or more processors in an electronic device. The one or more programs may include instructions that cause the electronic device to perform the methods according to the embodiments of the disclosure described in the claims or the specification of the disclosure.

These programs (software modules and software) may be stored in RAMs, non-volatile memories including flash memories, ROMs, electrically erasable programmable ROMs (EEPROMs), magnetic disc storage devices, CD-ROMs, DVDs, other types of optical storage devices, or magnetic cassettes. The programs may be stored in a memory configured by a combination of some or all of such storage devices. In addition, each of the memories may be provided in plurality.

The programs may be stored in an attachable storage device of the electronic device accessible via the communication network, such as Internet, Intranet, a local area network (LAN), a wireless LAN (WLAN), or storage area network (SAN), or a communication network by combining the networks. The storage device may access a device performing the embodiment of the disclosure through an external port. Furthermore, a separate storage device in a communication network may access a device performing the embodiment of the disclosure.

In the disclosure, the term "computer program product" or "computer-readable medium" may be used to overall indicate a memory, a hard disk installed in a hard disk drive, a signal, and the like. The term "computer program product" or "computer-readable medium" may be a means for providing a method of configuring a transmission power of an SL synchronization channel and an SL feedback channel according to the disclosure.

Disclosed embodiments of the disclosure may provide an apparatus and method for effectively providing a service in a wireless communication system. In the embodiments of the disclosure, components included in the disclosure have been expressed as singular or plural according to the provided embodiment of the disclosure. However, singular or plural expressions have been selected properly for a condition provided for convenience of a description, and the disclosure is not limited to singular or plural components, and components expressed as plural may be configured as a single component or a component expressed as singular may also be configured as plural components.

Meanwhile, the embodiments of the disclosure disclosed in the specification and drawings have been provided to easily describe the disclosure and to help with the understanding of the disclosure, and are not intended to limit the scope of the disclosure. In other words, it is apparent to one of ordinary skill in the art that other modifications based on the technical spirit of the disclosure may be carried out. In addition, the embodiments of the disclosure may be used in combination when necessary. For example, an embodiment of the disclosure may be combined with some parts of another embodiment of the disclosure. In addition, other modifications based on the technical spirit of the above-described embodiment of the disclosure may also be carried out in other systems, e.g., an LTE system, a 5G system, an NR system, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    receiving priority values for determining simultaneous physical sidelink feedback channel (PSFCH) transmission for a plurality of data transmitted through a plurality of physical sidelink shared channels (PSSCHs);
    receiving the plurality of data transmitted through the plurality of PSSCHs from at least one other terminal;
    in case that the terminal is capable of a maximum of N PSFCH transmissions and a number of at least one PSFCH transmission corresponding to the plurality of PSSCH receptions is greater than the N PSFCH transmissions, determining a number of the simultaneous PSFCH transmission to be equal to the N PSFCH transmissions based on the priority values; and
    performing, one or more PSFCH transmissions to the at least one other terminal, based on the number of the simultaneous PSFCH transmission.

2. The method of claim 1, further comprising:
    in case that the number of the at least one PSFCH transmission corresponding to the plurality of PSSCH receptions is equal to or less than the N PSFCH transmissions, determining the number of the simultaneous PSFCH transmission to be equal to the number of the at least one PSFCH transmission corresponding to the plurality of PSSCH receptions.

3. The method of claim 1,
    wherein the performing of the one or more PSFCH transmissions to the at least one other terminal comprises determining a transmission power of the one or more PSFCH transmissions based on at least one of a maximum output power, a downlink pathloss value, or a scaling factor,
    wherein the downlink pathloss value is determined based on a channel state between the at least one other terminal and a base station, and
    wherein the scaling factor is determined based on a subcarrier spacing value for all of the one or more PSFCH transmissions.

4. The method of claim 1, further comprising:
    receiving, from the at least one other terminal or another at least one other terminal, a sidelink-synchronization signal block (S-SSB), wherein the S-SSB comprises a sidelink-primary synchronization signal (S-PSS), a sidelink-secondary synchronization signal (S-SSS), a physical sidelink broadcast channel (PSBCH), and wherein a transmission power of each of the S-PSS, the S-SSS and the PSBCH is equal.

5. The method of claim 4, wherein a transmission power of the S-SSB is determined based on at least one scaling factor, and wherein the at least one scaling factor is determined based on a subcarrier spacing value for all of the S-PSS, S-SSS and the PSBCH.

6. A terminal in a wireless communication system, the terminal comprising:

a transceiver; and at least one processor coupled with the transceiver and configured to:

receive priority values for determining simultaneous physical sidelink feedback channel (PSFCH) transmission for a plurality of data transmitted through a plurality of physical sidelink shared channels (PSSCHs), receive the plurality of data transmitted through the plurality of PSSCHs from at least one other terminal, in case that the terminal is capable of maximum of N PSFCH transmissions and a number of at least one PSFCH transmission corresponding to the plurality of PSSCH receptions is greater than the N PSFCH transmissions, determine a number of the simultaneous PSFCH transmission to be equal to the N PSFCH transmissions based on the priority values, and perform one or more PSFCH transmissions to the at least one other terminal, based on the number of the simultaneous PSFCH transmission.

7. The terminal of claim 6, wherein the at least one processor is further configured to:

in case that the number of the at least one PSFCH transmission corresponding to the plurality of PSSCH receptions is equal to or less than the N PSFCH transmissions, determine the number of the simultaneous PSFCH transmission to be equal to the number of the at least one PSFCH transmission corresponding to the plurality of PSSCH receptions.

8. The terminal of claim 6, wherein the at least one processor is further configured to determine a transmission power of the one or more PSFCH transmissions, based on at least one of a maximum output power, a downlink pathloss value, or a scaling factor, wherein the downlink pathloss value is determined based on a channel state between the at least one other terminal and a base station, and wherein the scaling factor is determined based on a subcarrier spacing value for all of the one or more PSFCH transmissions.

9. The terminal of claim 6, wherein the at least one processor is further configured to:

receive, via the transceiver, a sidelink-synchronization signal block (S-SSB) from the at least one other terminal or another at least one other terminal, wherein the S-SSB comprises a sidelink-primary synchronization signal (S-PSS), a sidelink-secondary synchronization signal (S-SSS), a physical sidelink broadcast channel (PSBCH), and wherein a transmission power of each of the S-PSS, the S-SSS and the PSBCH is equal.

10. The terminal of claim 9, wherein a transmission power of the S-SSB is determined based on at least one scaling factor, and wherein the at least one scaling factor is determined based on a subcarrier spacing value for all of the S-PSS, S-SSS and the PSBCH.

* * * * *